(12) United States Patent
Matos

(10) Patent No.: US 7,106,676 B2
(45) Date of Patent: Sep. 12, 2006

(54) DISC PLAYER SYSTEM

(76) Inventor: Jose R. Matos, 8108 Fleetwood Dr., Plano, TX (US) 75025

( * ) Notice: Subject to any disclaimer, the term of this patent is extended or adjusted under 35 U.S.C. 154(b) by 504 days.

(21) Appl. No.: 10/645,941

(22) Filed: Aug. 22, 2003

(65) Prior Publication Data

US 2004/0136293 A1  Jul. 15, 2004

(51) Int. Cl.
  *G11B 5/09* (2006.01)
  *G11B 7/00* (2006.01)
(52) U.S. Cl. .............. 369/53.21; 369/53.37; 369/275.5; 369/47.12
(58) Field of Classification Search ............ None
  See application file for complete search history.

(56) References Cited

U.S. PATENT DOCUMENTS 6,791,937 B1 * 9/2004 Tosaki et al. ............ 369/275.3
2001/0013023 A1 * 8/2001 Oshima et al. ............ 369/84

* cited by examiner

Primary Examiner—Muhammad Edun
(74) Attorney, Agent, or Firm—Rick Matos; Innovar, L.L.C

(57) ABSTRACT

The present invention provides a disc player comprising one or more light sources that project a constant or pulsing light onto the upper portion of a disc being played by the disc player. If a constant light source is used, the a pulsing viewing port for the disc receptacle of the disc player is employed. The pulse frequency, pulse length, pulse period, pulse interval, pulse color, pulse intensity or a combination thereof of the light source or the pulse frequency, pulse length, pulse period, pulse interval, or light transmissivity of the one or more viewing ports can be synchronized with the rotation of the spindle or platen in the disc player, with the optical data stored, or with the rotation of an image precursor on the disc. When the disc is viewed through a viewing port while the disc is being played, a two-dimensional or three-dimensional discrete image is formed by the persistence of vision. The disc player can also include an anti-piracy system to prevent unauthorized playing of digital/optical disc content. The anti-piracy system includes a verification system and access control data. When permission granting information is obtained from the disc, the verification system compares it to the access control data and either allows or disallows the disc player to play the disc.

24 Claims, 12 Drawing Sheets

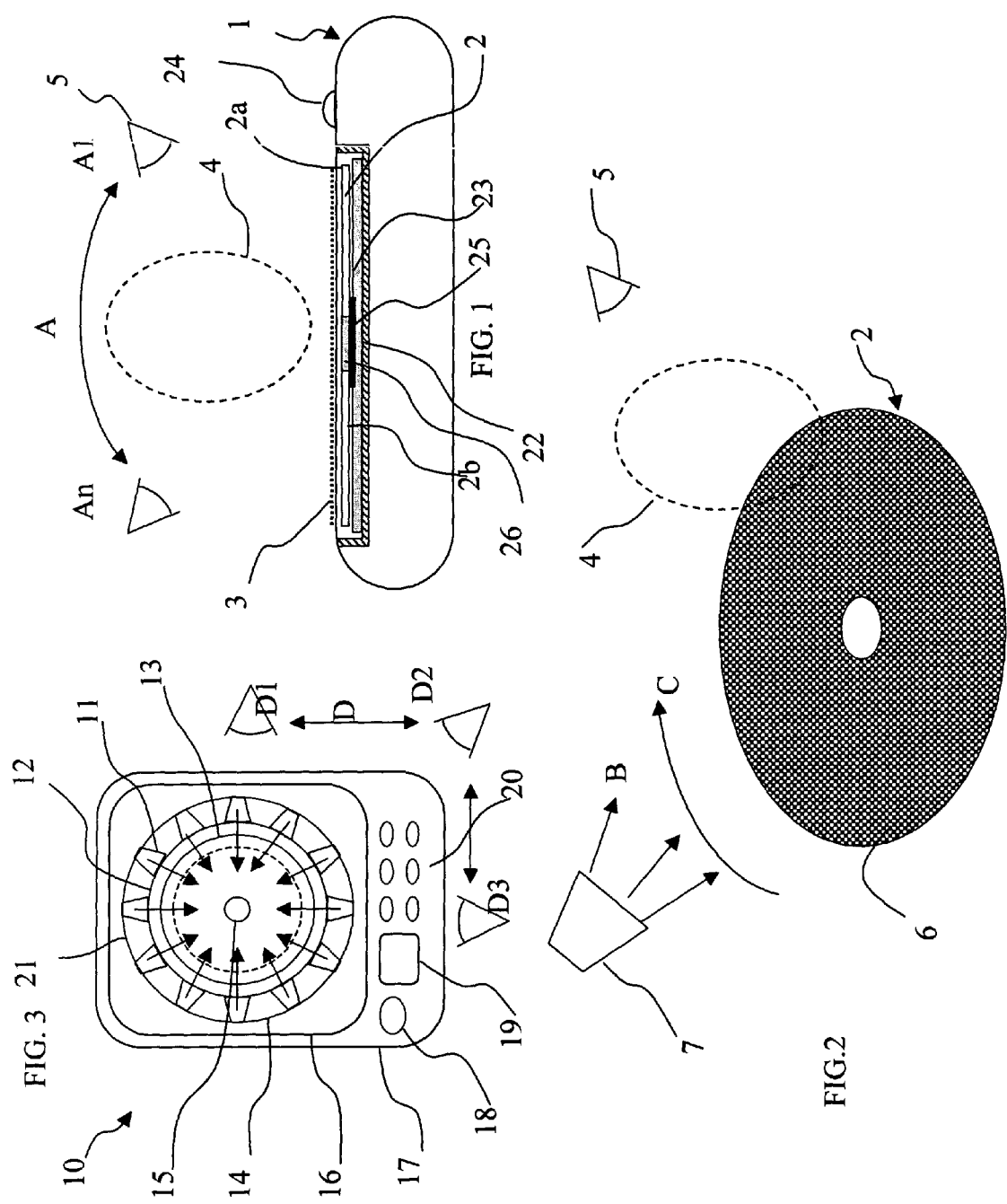

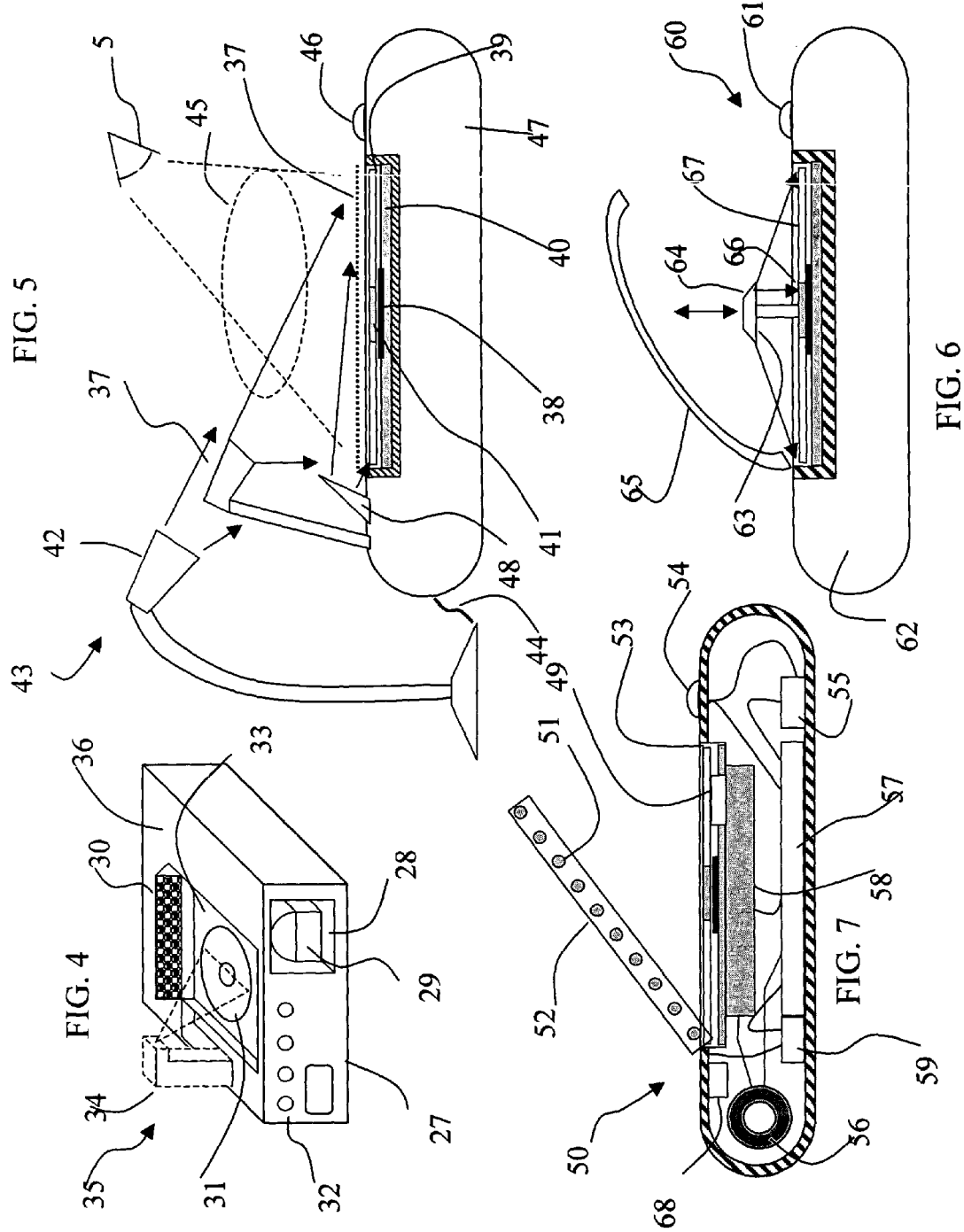

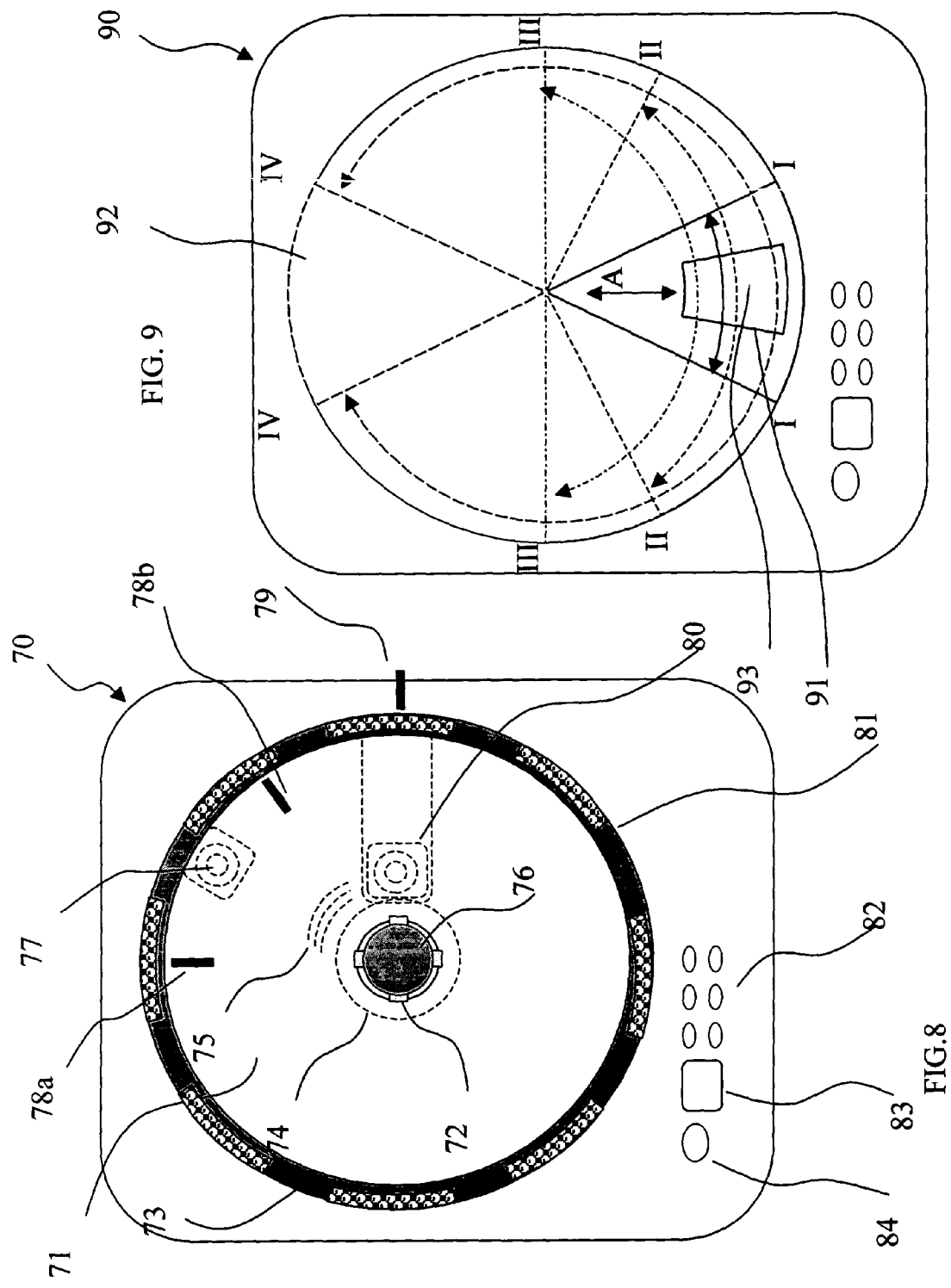

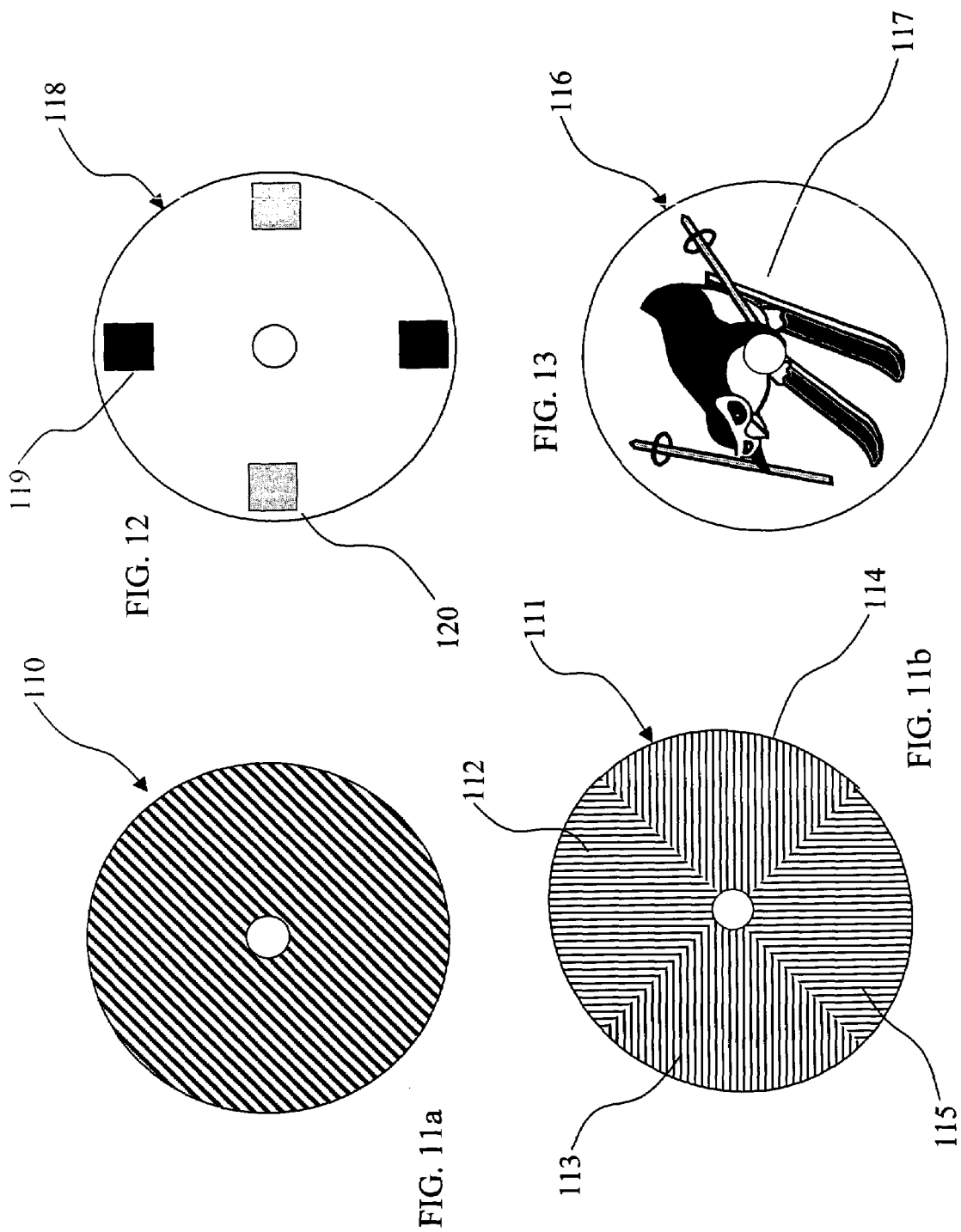

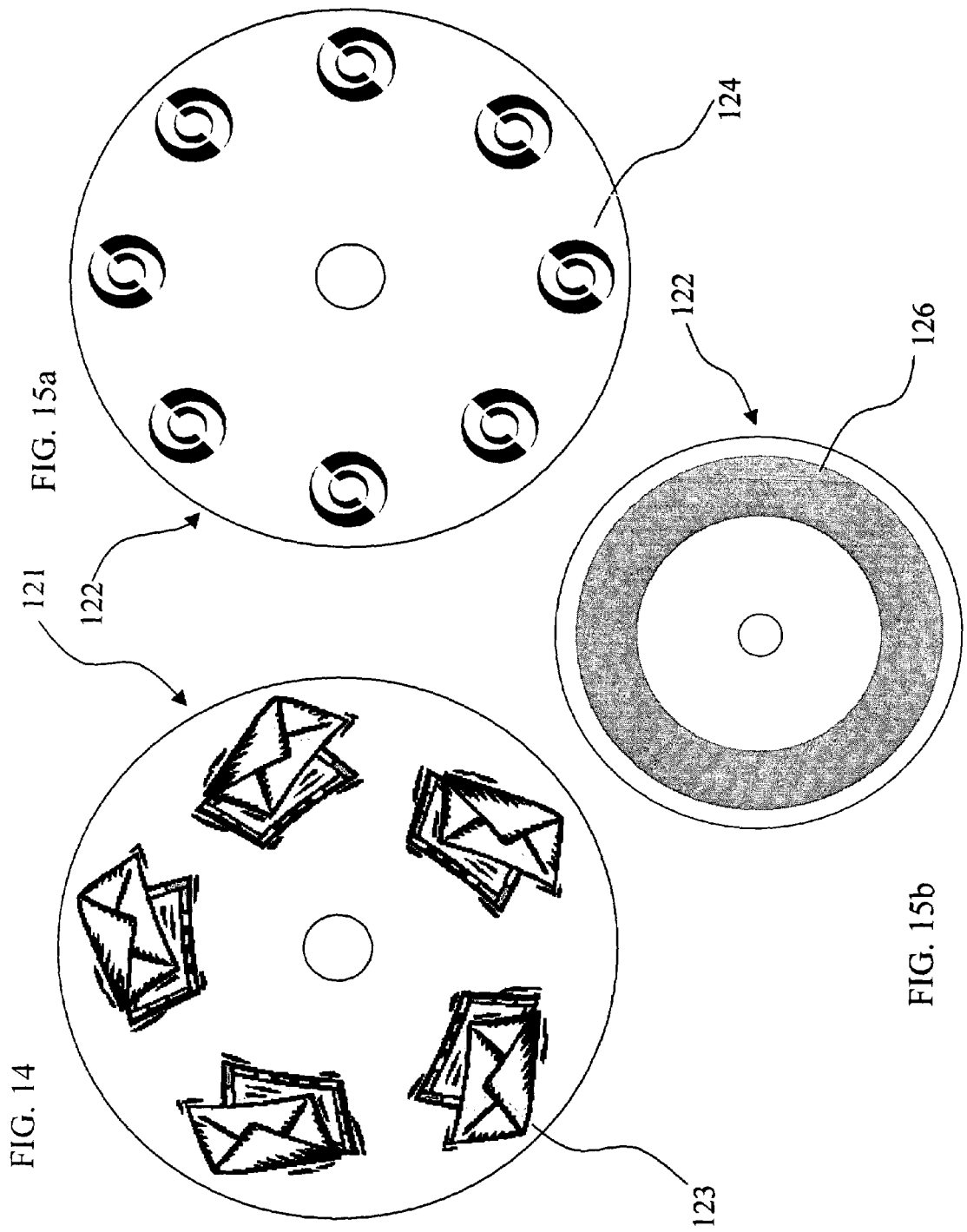

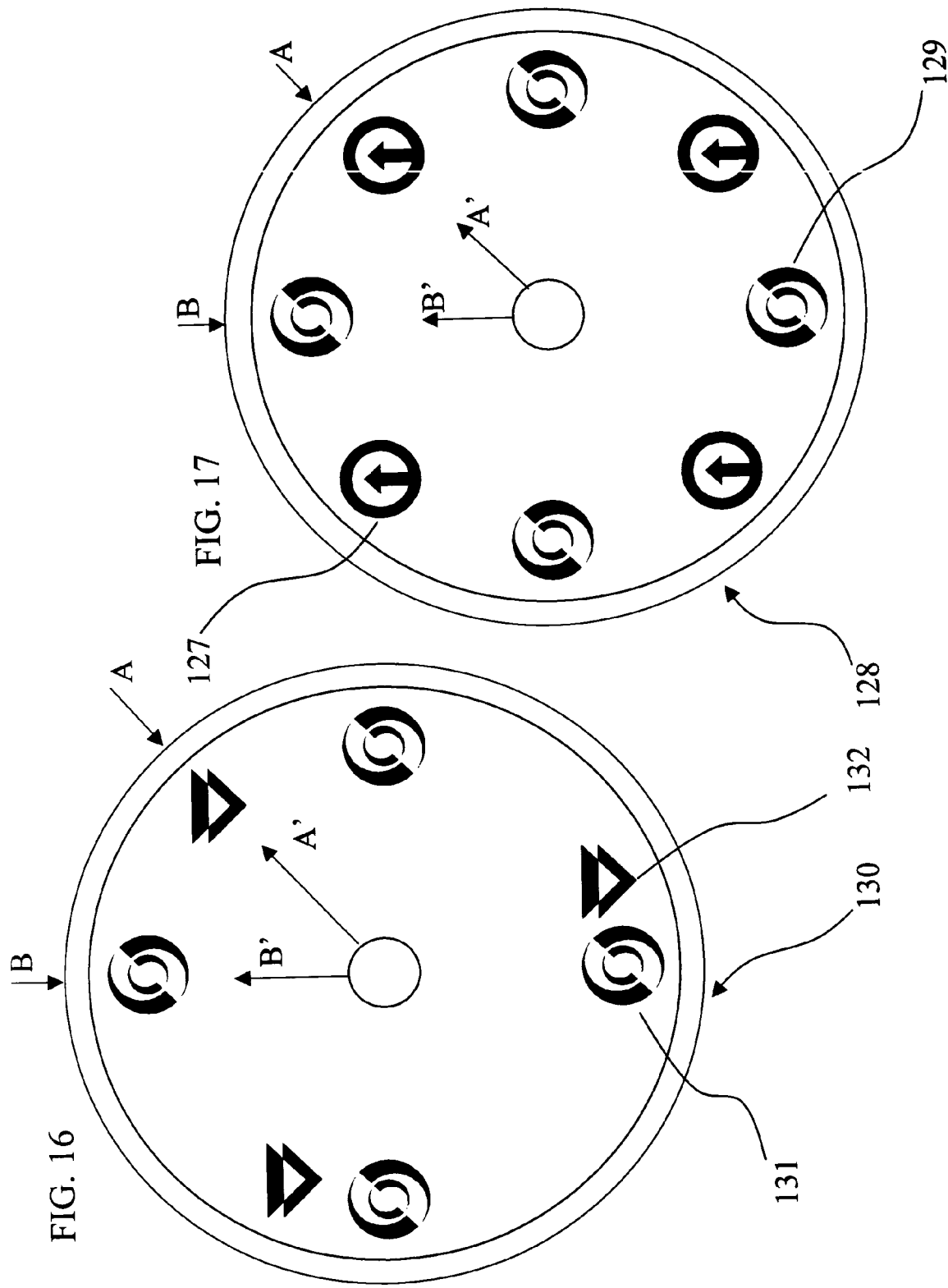

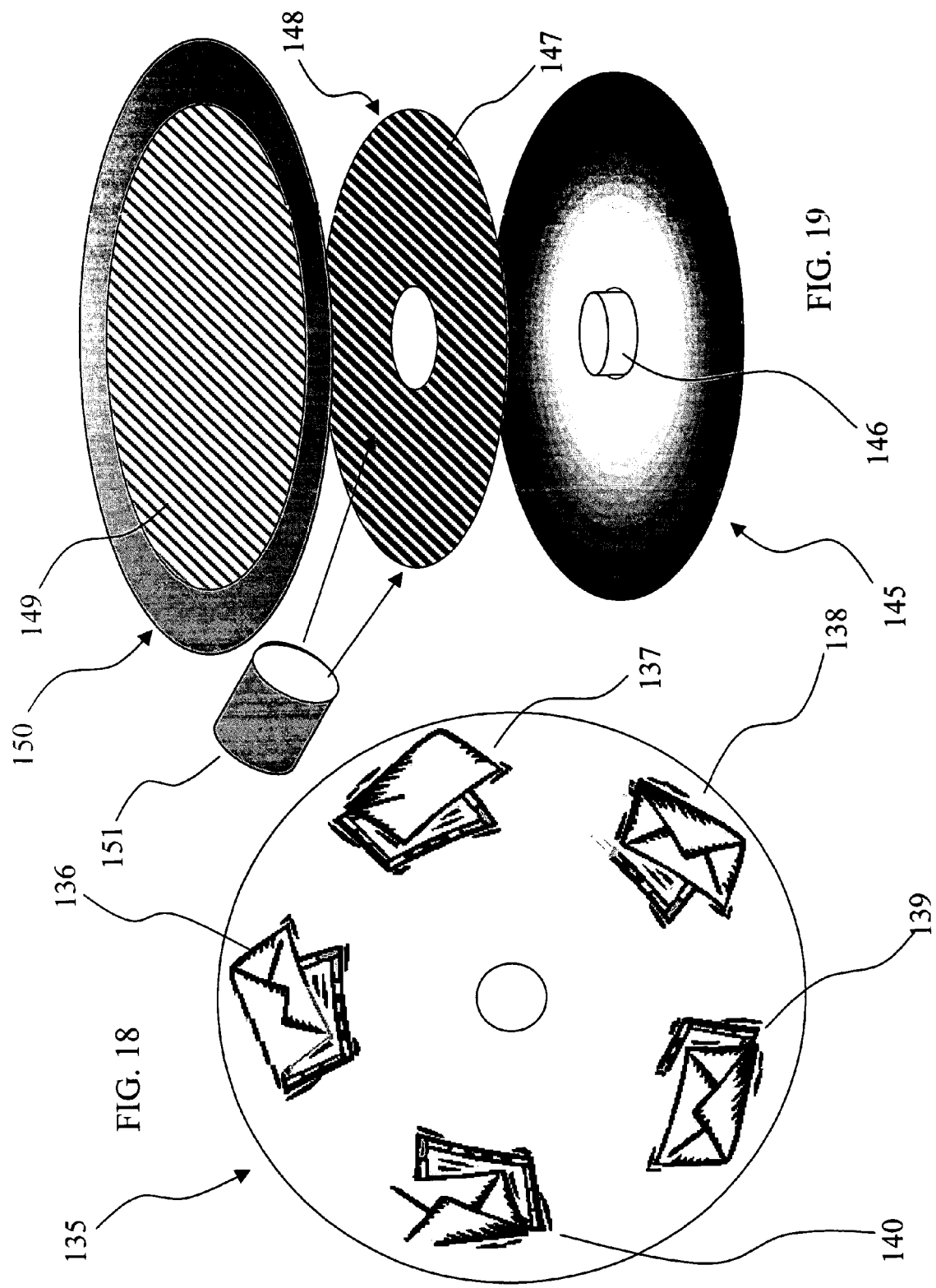

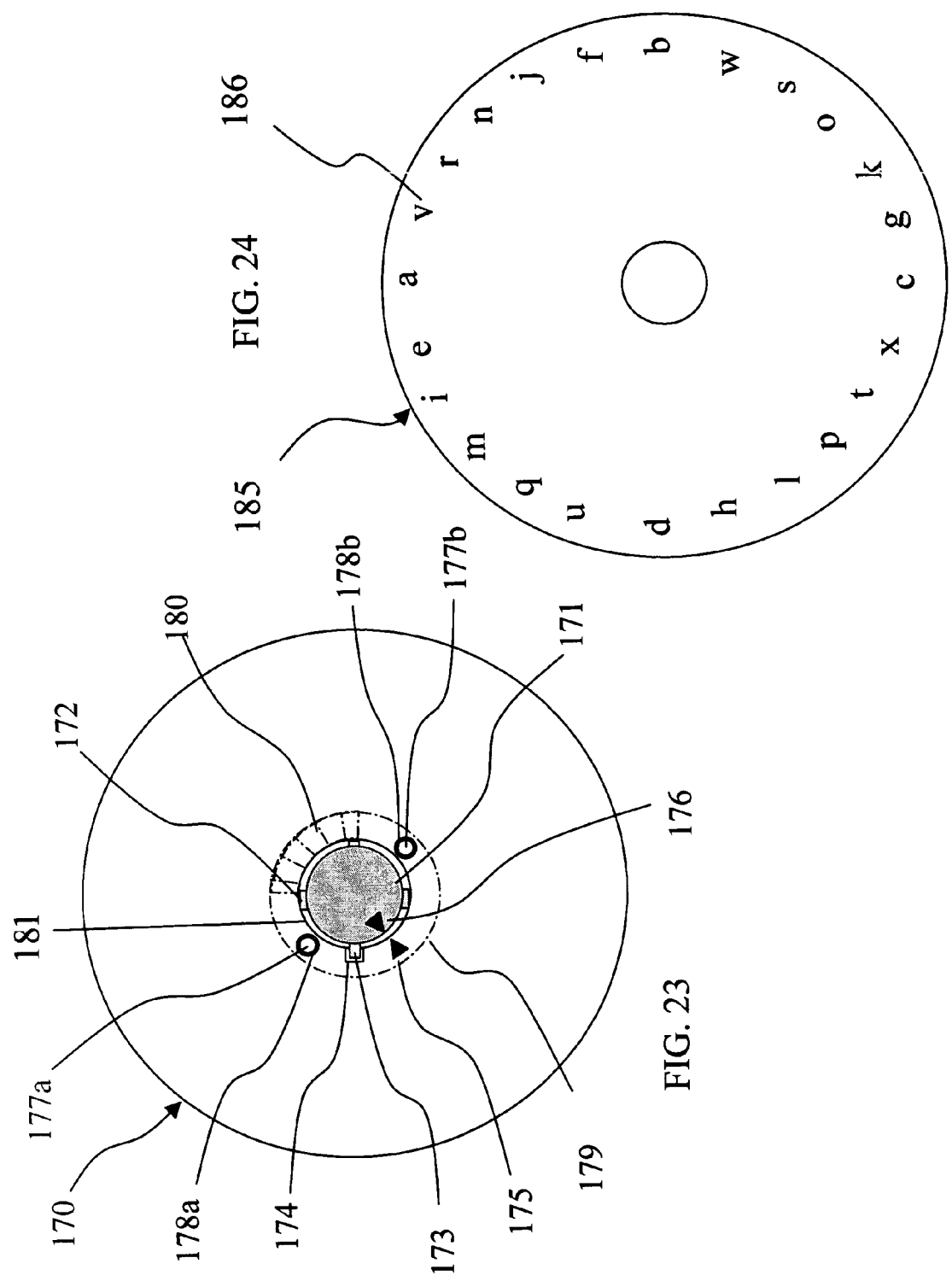

DISC PLAYER SYSTEM

FIELD OF THE INVENTION

The present invention relates to a disc player system, and in particular an optical disc player system that generates a two- or three-dimensional image by the persistence of vision on, below or above the viewable surface of a disc when the disc is played by a disc player having an optionally pulsing incident light illuminating the viewable surface of the disc. The invention also relates to such a disc player system incorporating an anti-piracy subsystem.

BACKGROUND OF THE INVENTION

Disc and disc player manufacturers are always searching for new products that enhance the interaction between the user and the disc player. Disc players for playing optical storage and magnetic storage discs are available commercially from companies such as Timast™, Cello™, Harmon Kardon™, Onkyo™, Symphonic™, JVC™, Pioneer™, Sony™, Kenwood™, RCA™, Technics™, AIWA™, Philipps™, Classic™, Oritron™, Grand Prix™, Panasonic™, Toshiba™, Apex™, Samsung™, Zenith™, GPX™, Tozai™, WhiteWestinghouse™, Audiovox™, Curtis™, Admiral™ and others. These generally include CD, DVD, VCD and MP3 players. Generally, only the portable CD players include a viewing window to expose a small portion of the surface of a disc being played. None of the known disc players include a pulsing or flashing light illuminating the upper surface of the CD and forming a discrete image thereon while the disc is being played. The discs generally include some form of indicia disposed on or adjacent the upper surface and some form of information storage medium viewable and readable from the lower surface. Sometimes, the information storage medium forms an iridescent rainbow image when viewed from above or below the surface of the disc. However, when the disc is played in the player, no discreet two- or three-dimensional image is formed on or projected from the upper surface of the disc. The information storage medium generally stores machine readable optical information.

Rotating discs (not optical data storage discs) that form variable light diffraction patterns when viewed under a non-pulsing light are available from companies such as LIGHTRIX HOLOGRAPHIC PRODUCTS (San Leandro, Calif.). These discs, however, do not possess a machine-readable optical information storage medium and they are not adapted to generate a discrete 2- or 3-D image by the persistence of human image when placed in a disc player while the disc player is reading the stored information.

Piracy of music and video content is a significant problem in the entertainment industries. Hundreds of millions of dollars in potential revenue are lost due to illegal copying of the music and/or video content. A number of anti-piracy systems to prevent or reduce the ease of such illegal copying have been developed. Some of these systems employ code embedded in the storage medium of the disc or a bar code.

Accordingly, the prior art does not disclose disc players and associated optical discs that form one or more two- or three-dimensional moving or still images by the persistence of human vision on, below or above the upper surface of the disc while the disc is being played. The art also fails to disclose such as system having an anti-piracy subsystem included therein or integrated therewith.

SUMMARY OF THE INVENTION

The present invention seeks to provide a disc player system that provides an improved interaction between a user, the disc player and the disc. One aspect of the invention provides a disc player comprising:
 a disc receptacle;
 a viewing port for the receptacle; and
 a light source that projects pulsing incident light into the receptacle such that when an optical disc is being played by the disc player, one or more discrete two-dimensional and/or a three-dimensional images are formed on, below or above the viewable surface of the disc by the persistence of human vision when the disc is viewed through the viewing port.

Another aspect of the invention provides a disc player system comprising:
 a disc player comprising a viewing port, a disc receptacle, and a pulsing light source that projects light into the receptacle; and
 an optical disc comprising an upper portion comprising an image-forming medium and a lower portion comprising an information storage medium, wherein one or more two- or three-dimensional images are formed on, below or above the upper portion of the disc by the persistence of human vision when the disc is in the receptacle, is being played by the disc player in the presence of incident light from the light source, and is being viewed by a human.

Yet another aspect of the invention provides a disc comprising:
 an upper portion comprising an image-forming medium;
 a lower portion comprising an information-storage medium; and
 at least one position marker on the upper and/or lower portion of the disc;
 wherein, one or more two- or three-dimensional images are formed on or projected from the upper portion by the persistence of human vision when the disc is played by a disc player in the presence of incident light from a light source.

Still another aspect of the invention provides a method of generating a discrete two-dimensional or three-dimensional image comprising the step of:
 a) illuminating the upper surface of an optical disc, comprising an image-forming medium in an upper portion and an information storage medium in a lower portion, with a pulsing light source;
 b) playing the disc in a disc player having a disc receptacle, a viewing port, and a pulsing light source that projects the pulsing light onto the image-forming medium; and
 c) viewing the upper surface of the disc through the viewing port as the disc is being played by the disc player, thereby forming one or more two- or three-dimensional images by the persistence of human vision.

Specific embodiments of the invention include those wherein: 1) the viewing port superposes the receptacle; 2) the disc player further comprises a cover for the receptacle, and the viewing port is disposed within the cover; 3) the disc player comprises two or more viewing ports; 4) the pulsing light source is one or more of an incandescent bulb, halogen bulb, fluorescent bulb, laser, electroluminescent light, light emitting diode, cathode ray tube, spotlight, or light beam; 5) the light source is operably controlled by the disc player or the user of the system; 6) the interval, period, frequency, color and/or color of the light source is controlled by one or more of an integrated circuit, software, hardware, computer, macro, discreet logic, subroutine, electronic component or other convention light controller; 7) the light source is disposed within the receptacle, disposed adjacent the receptacle and/or engaged with the cover; 8) the light source is movably engaged with the disc player; 9) the light source is fixedly engaged with the disc player; 10) the disc player comprises a spindle and the light source is engaged with the spindle; 11) the spindle or light source is retractably engaged with the disc player; 12) the cover is movably engaged with the disc player; 13) the cover is fixedly engaged with the disc player; 14) the disc player is a hand-held type of disc-player; 15) the disc player is a shelf-or surface-mounted type of disc-player; 16) at least two different two-dimensional images, at least two different three-dimensional images, or at least one two-dimensional image and at least one three-dimensional image are formed on, above or below or projected from the upper surface of the disc by the persistence of human vision when the disc is being played; 17) the different images are formed by viewing the disc being played at different angles with respect to the radial center of the disc; 18) the different images are formed by viewing the disc being played at different vertical angles with respect to the upper surface of the disc; 19) the different images are formed by changing the manner in which the light source projects light; 20) the different images are formed by changing the color of the light; 21) the light source comprises plural discreet light sources and the different images are formed by changing which light sources are lit or changing the brightness of the light source; 22) the disc being played contains visual and/or audio information stored in a storage medium and the different images are formed in coordination with the stored information; 23) the light source is operably controlled by the disc player; 24) the disc player further comprises a spindle and a position indicator that indicates the relative position of the disc being played with respect to the spindle; 25) the position indicator is at least one of engagement means in the spindle and/or disc, retainer in the spindle, indicia on the spindle and/or disc, and data stored in the disc; 26) the position indicator is disposed on at least one of the disc being played, the spindle and the receptacle; 27) the disc and platen or spindle comprise mating engagement means; 28) disc player comprises a viewing port that is slidably engaged with the cover such that the viewing port can assume different positions with respect to the cover, body of the disc player or spindle; 29) the light source is disposed adjacent the viewing port; 30) the light source is engaged with the cover, and the viewing port is disposed within the cover; 31) the discrete image is a still image; 32) the discrete image is a moving image; 33) the viewing port is integral with the cover; 34) the cover has a transparent or translucent portion that serves as the viewing port; 35) different images are formed by changing the frequency, interval, period, pulse length and/or color of the pulsing light; 36) the cover comprises plural viewing ports; 37) the viewing port(s) comprises a viewing port cover; 38) the disc player comprises an optical reader adapted to determine the relative angular position of a disc being played; 39) the disc comprise encoded lenticular image segments and the viewing port or cover comprises a lenticular lens adapted to decode the encoded lenticular image segments and form a discrete image; and/or 40) the disc has a light transmissive portion and the disc player comprises a platen or receptacle bottom comprising a light source adapted to project light through the light transmissive portion of the disc.

Another aspect of the invention provides a disc player comprising:

a disc receptacle;

a pulsing viewing port for the receptacle; and a light source that projects incident light into the receptacle such that when an optical disc is being played by the disc player, one or more discrete two-dimensional and/or a three-dimensional images are formed on, below or above the viewable surface of the disc by the persistence of human vision when the disc is viewed through the viewing port.

The pulsing viewing port permits intermittent viewing access to the receptacle. When a disc is played by the player, the light source illuminates the surface of the disc. When desired, the viewing port pulses its transparency such that light reflected from the surface of the disc is intermittently projected through the viewing port. A user viewing the intermittent projected light will, by the persistence of human vision, perceive a discrete two-dimensional or three-dimensional image on, below or above the viewable surface of the disc. In this particular embodiment, the light source can be a constant light source or a pulsing light source.

Specific embodiments of the invention include those wherein: 1) the pulsing viewing port comprises one or more controllable elements that intermittently transmit and block light; 2) the light source is a constant light source; 3) the light source is a pulsing light source that cooperates with the pulsing viewing port to create the discrete image; 4) the pulsing viewing port comprises one or more controllable light valves; 5) the pulsing viewing port comprises a controllable shutter; and/or 6) the pulsing viewing port is operably controlled by the disc player.

Each embodiment of the invention optionally includes an anti-piracy system. The anti-piracy system employs a verification system that verifies the presence of a permission-granting indicator in the CD or DVD being played. In one embodiment, operation of the anti-piracy system is coordinated with and/or integrated into the image-producing system of the player.

Specific embodiments of the anti-piracy system include those wherein: 1) the anti-piracy system uses at least a portion of the position marker used in the image-producing system; 2) the anti-piracy system is integrated into the image-producing system; 3) operation of the anti-piracy system is coordinated with operation of the image-producing system; 4) the permission-granting indicator is the same as or at least a part of the position marker; 5) the permission-granting indicator is different than and optionally spaced away from the position marker; 6) the permission-granting indicator is programming code embedded in the storage media of the disc; 7) the permission-granting indicator is visually perceptible; 8) the permission-granting indicator is visually imperceptible; 9) the permission-granting indicator is readable by the reading means a player uses to read the optical data stored in the storage medium of the disc; 10) the permission-granting indicator is a graphic, text, differentially sensible material, barcode, dot code, grey-scale code, or a combination thereof.

These and other aspects and embodiments of the invention will be readily understood by the artisan of ordinary skill in view of the present disclosure.

BRIEF DESCRIPTION OF THE FIGURES

The following drawings are part of the present specification and are included to further demonstrate certain aspects of the invention. The invention may be better understood by reference to one or more of these drawings in combination with the description of the specific embodiments presented herein.

FIG. 1 depicts a partial sectional side elevation of a first embodiment of a disc player system of the invention.

FIG. 2 depicts a perspective view of a disc used in the system of the invention.

FIG. 3 depicts a top plan view of a second embodiment of a disc player system of the invention.

FIG. 4 depicts a perspective view of a surface mounted disc player system of the invention.

FIG. 5 depicts a partial sectional side elevation of a hand-held disc player system of the invention.

FIG. 6 depicts a partial sectional side elevation of another embodiment of the disc player system of the invention.

FIG. 7 depicts a sectional side elevation of yet another embodiment of the disc player system of the invention.

FIG. 8 depicts a top plan view of another embodiment of the disc player system of the invention.

FIG. 9 depicts a top plan view of another embodiment of the disc player system of the invention.

FIG. 11a depicts a top plan view of a disc adapted for use in the disc player of the invention.

FIG. 11b depicts a top plan view of a disc adapted for use in the disc player of the invention.

FIG. 12 depicts a top plan view of a disc adapted for use in the disc player of the invention.

FIG. 13 depicts a top plan view of a prior art disc that can be used in the disc player of the invention.

FIG. 14 depicts a top plan view of a disc adapted for use in the disc player of the invention.

FIGS. 15a,b depicts a top plan view of a disc adapted for use in the disc player of the invention.

FIG. 16 depicts a top plan view of a disc adapted for use in the disc player of the invention.

FIG. 17 depicts a top plan view of a disc adapted for use in the disc player of the invention.

FIG. 18 depicts a top plan view of a disc adapted for use in the disc player of the invention.

FIG. 19 depicts a top plan view of a partial disc player system of the invention.

FIG. 23 depicts a top plan view of a disc and spindle used in the system of the invention.

FIG. 24 depicts a top plan view of a disc according to the invention.

DETAILED DESCRIPTION OF THE INVENTION

Figure 10:
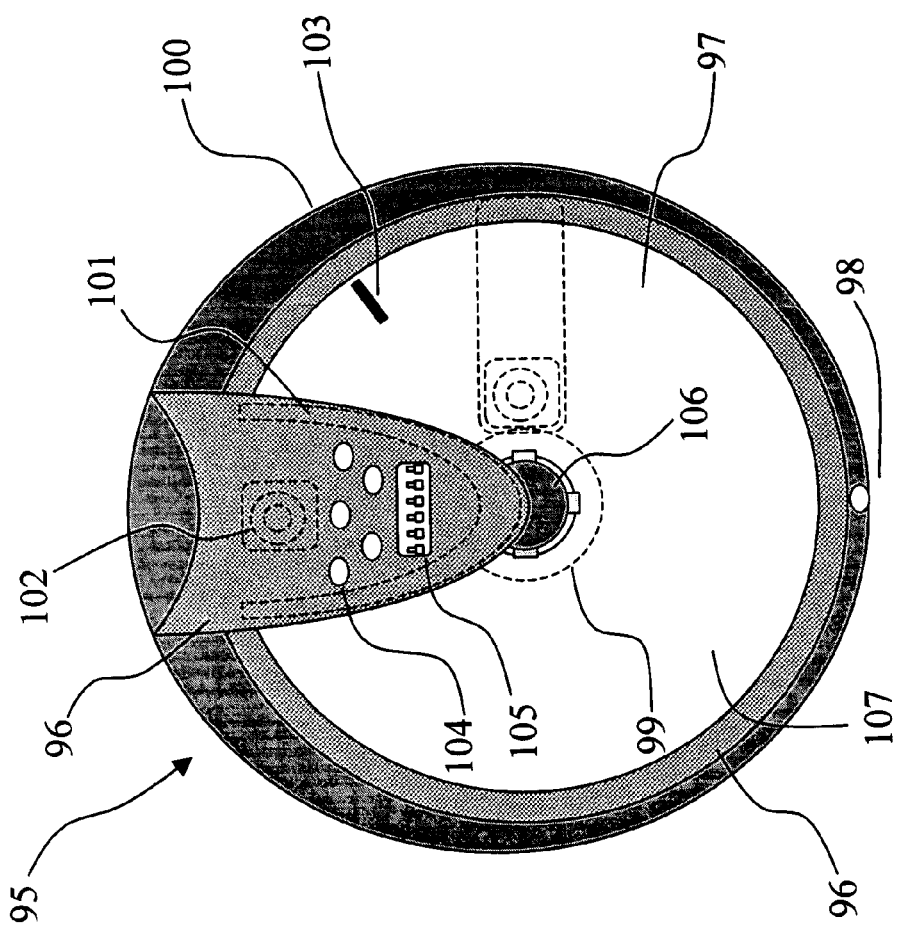
FIG. 10 depicts a top plan view of another embodiment of the disc player system of the invention.

The anti-piracy system of the invention is designed to prevent a disc player from playing illegally-obtained digital/optical content on a disc. The digital (and/or optical) content can include software, audio data, visual data, and any other data typically stored in the storage medium of a disc. Illegally-obtained content is identified as digital/optical information obtained by unauthorized copying of copyrighted information onto the disc. The purpose of the anti-piracy system is to discourage the illegal copying of audio/visual/data content onto discs by providing a player according to the invention that will generally not render such content viewable or audible to a user of the player. Typically, any anti-piracy system built into a disc player or disc discourages users from purchasing those disc players or from copying those discs. By providing the image-producing system in combination with the anti-piracy system, users are encouraged to interact with the player while at the same time being discouraged from illegally copying content. Accordingly, an integrated disc player of the invention comprises an anti-piracy system, an image-producing system and a disc-playing system (the system that reads disc content and renders it viewable and/or audible to a user on an output device operably linked to the disc player or an output component that is part of the disc player or disc player system), wherein operation of at least two, optionally at least three, of the systems is integrated. The invention thus provides a disc player comprising an image-producing system operationally integrated with an anti-piracy system, or an image-producing system operationally integrated with a disc-playing system, or an image-producing system operationally integrated with a disc-playing system and an anti-piracy system.

In some embodiments of the invention, the anti-piracy system is an optional component of a disc player or disc player system.

The present invention provides an information storage disc, disc player and disc player system capable of forming a human-viewable two- and/or three-dimensional image on or projecting from the disc when the disc is being played, e.g., when information stored on the disc is being read, by the disc player or when the disc is being spun by the disc player. The image is formed by viewing one or more image precursor during play of the disc in the disc player.

The persistence of human vision is based upon the following concepts. The human brain retains an image for a fraction of a second (about $1/10^{th}$ to $1/30^{th}$, or about $1/16^{th}$, of a second) longer than the eye actually sees it. The retinas of the eyes contain receptors that are light sensitive. When the light source is removed or changed, an image remains for a very short period of time. This is called persistence of (human) vision. If a series of pictures is shown one after the other, the eyes give the illusion of movement or of the creation of a discrete image from what may not have appeared to be a discrete image when the image-precursor is not spinning. Motion pictures are an example of this principle. During the 1800's, thaumatropes, flip-books, and heliotropes provided hours of entertainment for lighthouse keepers and their families. Another example of the persistence of human vision follows. When a person watches a movie, what he are actually sees is individual still frames of film projected at 24 frames per second. Each of these frames is separated by darkness, so he is sitting in a dark theatre about half of the 20 time. The images are discontinuous; that is, all of the action that happened between the frames is not represented. Because of persistence of vision, what he perceives is one image blending into the next, giving the illusion of movement and continuity. The dark spaces are "ignored" by the brain.

The series of images can be generated from the surface of a disc played by a disc player by using an incident light and a viewing port for the disc player. The incident light can be a pulsing light or a constant light, i.e., one that does not pulse during operation. The viewing port can be a constantly transparent (even translucent) viewing port or a pulsing viewing port, i.e., one which transparency is intermittent during operation.

CD's, DVD's, and other information storage discs can be obtained from Abbey Road Interactive™, Americ Disc™, Disc Manufacturing, Inc.™, Grimes Co.™, Metatec™, FilmTecknikk Norge AG™, Organa™, Pioneer™, Warner Advanced Media Operations™, Memorex™, Verbatim™, and other companies. Commercially available discs can be modified according to the invention to include an image-forming medium in the upper portion and an optical information storage medium in the lower portion. The information storage medium generally includes machine-readable optical information. The CD's and DVD's used in the invention can have one or more layers of information stored therein.

Light sources are available from almost any electronics retailer, wholesaler or manufacturer. Strobe (pulsing) lights are also available from retailers such as PULSAR LIGHTING™, TOPBULB.COM™ (East Chicago, Ind.), NOVELTYLIGHTS.COM™, HOLLYWOOD LIGHTS, INC.™ (Portland, Seattle), NOVA ELECTRONICS™, and THE LEDLIGHT™ (North Las Vegas, Nev.). A particularly useful strobe light uses a white LED or xenon bulbs used in the strobe flash accessory of a camera.

A pinpoint light source such as a laser can be used as the pulsing light source. Suitable miniature lasers include a miniature diode laser such as that sold by LaserMax, Inc. (Rochester, N.Y.), Laser Quantum, Ltd., or Laser Components GmbH (Olching, Germany), Photonetics (France). These include a manually tunable laser diode, electronically tunable laser diode, diode pumped laser system and other miniature lasers known to those of ordinary skill in the art. Plural light sources that cooperate to form an image can be used.

Any known light source can be used as the constant light source. Likewise, almost any given light source can be adapted to be a constant light source or a pulsing light source. Some suitable light sources include light bulbs, incandescent bulbs, neon bulbs, fluorescent bulbs, black light bulbs, white light bulbs, colored light bulbs, electroluminescent light sources, infrared bulb, ultraviolet bulb or any known light source. Even reflected ambient light or sunlight can be adapted for use in the disc player of the invention.

When a pulsing light source is used, the strobe (pulse) frequency, period, interval, intensity color, beam shape and/or pulse length can be changed to effect the formation of different discrete images. As used herein, the strobe frequency is the number of light pulses the strobe light generates in a given period of time, e.g., 60 pulses per second. Any strobe frequency can be used with the system described herein. As used herein, the strobe interval is the period of time that occurs between pulses. Any strobe interval can be used with the system described herein. As used herein, the strobe pulse is the period of time that the light source is actually illuminating between intervals. Any strobe pulse can be used with the system described herein. As used herein, the pulse period is the pulse length and pulse interval added together. As used herein, the pulse intensity is the brightness of the pulse. Generally a pulsing light source will turn off completely after a first pulse before it begins a next pulse, i.e., the pulsing light source will be illuminated during the pulse and not illuminated during the pulse interval. However, a suitable pulsing light source can also remain illuminated, albeit at a reduced level, during the pulse interval. For example, the pulsing light source can have a pulse intensity during the pulse that is at least two times, three times, four times, five times, ten times, fifty times or a hundred times or more, brighter than the pulse intensity during the pulse interval. It is only necessary that the strobe light provide a sufficient amount of light for a sufficient period of time at an appropriate frequency to cooperate with the image precursor to form a discrete image by the persistence of vision when the disc is played and viewed. The strobe pulse will generally last between 0.01–0.5 sec, 0.03–0.4 sec, 0.025–0.25 sec, or 0.03–0.125 sec.

The strobe frequency of the strobe light can be modified to fit the particular layout of the image precursor or image precursor segments on the disc. Therefore, the strobe frequency can be a multiple or factor of the rotational speed of the disc multiplied by the number of image precursor segments that individually or cooperatively form the intended discrete image. For example, if the disc is viewed under a strobe light while the disc is spinning at a rotational speed of 6 revolutions/sec, a discrete image is formed by using a strobe frequency of 6 pulses/sec, 12 pulses/sec, 18 pulses/sec, 24 pulses/sec, 30 pulses/sec or so on when the disc is viewed through the viewing port.

According to another embodiment, when the disc is played at a rotational speed of 10 revolutions/sec and the beginning of the sequence of pulses, i.e., the period of a pulse, is synchronized with the angular movement of the image precursor segments on the disc, a strobe frequency of 10 pulses/sec will permit formation of a first discrete image. However, if the period of the pulses is offset by about 0.25 sec (the period of time that passes during a ¼ revolution at a speed of 10 pulses/sec), as compared to the other beginning time point, another discrete image will be viewable, but the first discrete image will not be viewable. The above example is particularly true when the viewing port is about $\frac{1}{4}^{th}$ the size or less than $\frac{1}{4}^{th}$ the size of the disc.

Rather than changing the strobe frequency of a light source, the color of a light source can be strobed to effect the formation of a discrete image. For example, when a disc comprising first and second image precursors that have been color coded in different manners is illuminated with a color changing strobe light source which color alternates between red incident light, white incident light, and yellow incident light at the proper frequency and pulse length, three differently colored discrete images are formed.

It is also possible for the strobe light to provide a combination of the two above-described strobe operations, e.g., strobed light pulses of different colors.

Control of the light sources is made possible by use of control means. The control means can be a computer, circuitry, discreet logic, machine language, software program, hardware, software macro, software subroutine, hand control(s), electronic component(s), and combinations thereof. Such light controls are well known and any such light control can be modified to operate as described herein. Suitable light controls are available from strobe light, LED display, flat panel display or electronic component manufacturers or suppliers, for example. Where the light source does not change color or does not strobe, such control of the light source will generally not be necessary. The intensity and/or brightness of the light source can also be controlled if needed, and any known method can be used to control the same. Pulsing light sources having a fixed strobe frequency can also be used.

Figure 22:
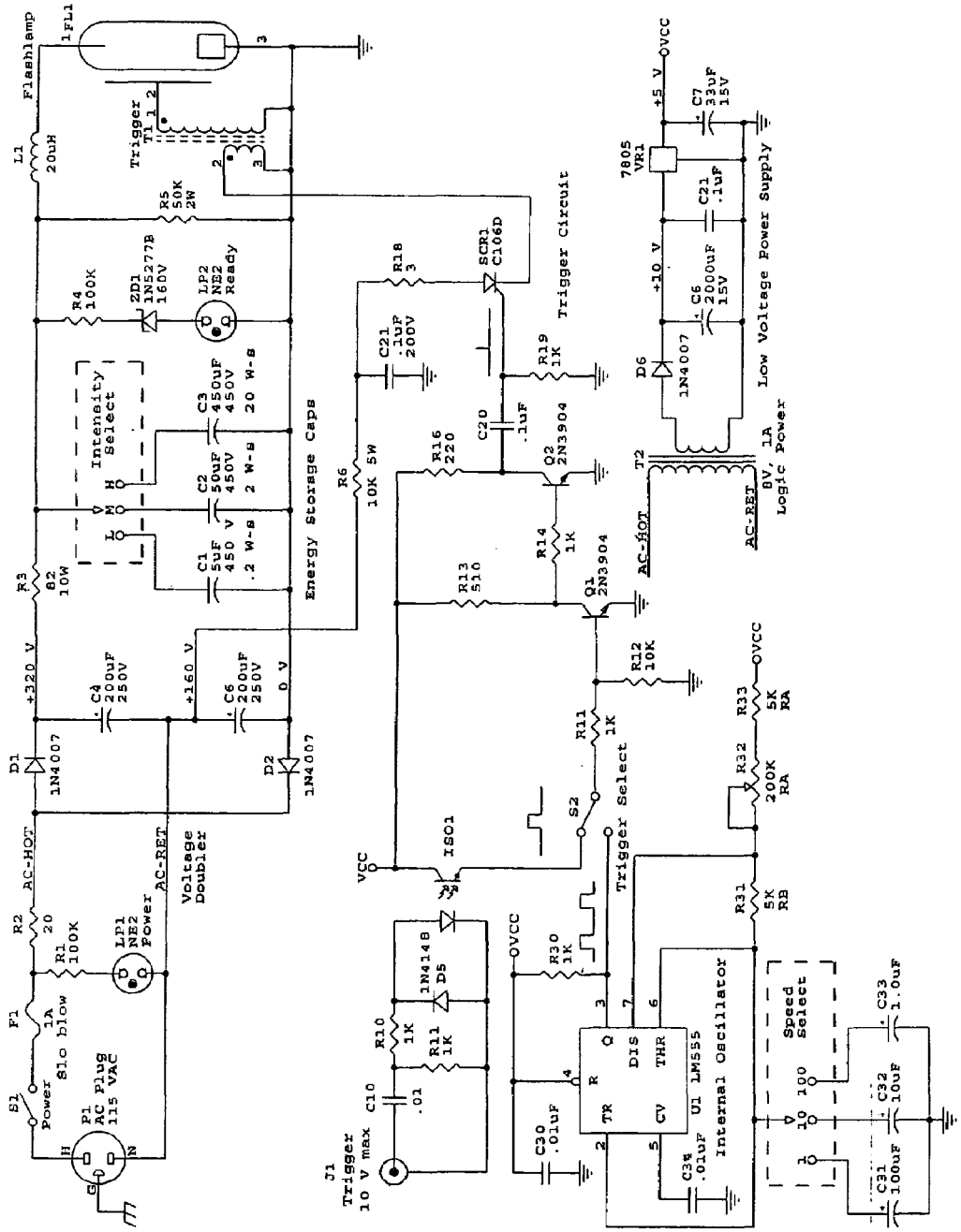
FIG. 22 depicts a schematic of an exemplary strobe light.

According to one example, a strobing light source is controlled by a combination of electronic components, software and hardware. Some of the same components used to control conventional strobe lights can be used to control the strobe light used in the disc player. Some of the same hardware and software used in conventional disc players can be used to control the rotation of the disc. By using synchronization means as part of the control means, the disc player will synchronize (coordinate) some aspect of the strobing with rotation of the disc, platen or spindle such that the associated strobe light will cast an incident light upon the upper surface of the disc in a predetermined manner to form at least one discrete image. Exemplary electronic components typically included in strobe lights include a line operated voltage doubler power supply, power transformer operated low voltage logic supply, variable frequency repeat mode control, 555 timer, optoisolated external trigger input, LED, transistor oscillator, step-up transformer, resistor, capacitor, diode, internal oscillator circuit, speed select circuit, logic power circuit, transformer circuit, inverter, trigger circuit, integrated circuit chip, and other such components known to those of ordinary skill. FIG. 22 depicts an exemplary circuit for a strobe light. This circuit can be modified for low voltage use such that it can be driven by one or more batteries such 0.15, 0.3, 0.5, 1.0, 1.5, 3.0, 9.0 or 12 volt batteries or combinations thereof. Alternatively, the circuitry of the disc player can be adapted for use with an AC/DC converter/transformer.

Disc players for playing optical storage and magnetic storage discs are available commercially from companies such as Timast™, Cello™, Harmon Kardon™, Onkyo™, Symphonic™, JVC™, Pioneer™, Sony™, Kenwood™, RCA™, Technics™, AIWA™, Philipps™, Classic™, Oritron™, Grand Prix™, Panasonic™, Toshiba™, Apex™, Samsung™, Zenith™, GPX™, Tozai™, WhiteWestinghouse™, Audiovox™, Curtis™, Admiral™ and others. These generally include CD, DVD, VCD and MP3 players. These disc players can be modified as described herein to prepare disc player systems according to the invention. For example, a commercial disc player having a viewing port is modified by including a pulsing light source either in proximity of or within the disc receptacle. The light source of this exemplary embodiment can cast a pulsing beam incident on the upper surface of a disc being played by the player such that a discrete image is formed when the disc is viewed by a person. In one embodiment, the disc player is a novelty disc player that does not read optical data stored on the disc. A disc player can be handheld, shelf-mounted, surface-mounted, console mounted, vehicle mounted, or dashboard mounted. The disc player can be part of a tape player, video recorder, video player, computer, projector, special effect generating device, television, laser, laser display, jukebox, electronic musical instrument, image displaying device, sound generating device, odor generating device, artificial smoke generator, machine, amplifier, radio, and other such entertainment related electronic devices. The disc player can also be part of a multi-component system.

As used herein, the term "image-forming medium" means a medium that bears an image precursor such that one or more of a discrete two- or three-dimensional image is formed when the image-forming medium is viewed while rotating (spinning) in a disc player. The image is formed by the persistence of human vision when incident light strikes the spinning image-forming medium and reflects into the eye of a viewer.

The image precursor can comprise plural hologram image precursor segments or plural embossed image segments that form a three-dimensional image according to the invention when viewed while being played in a disc player.

The image-forming medium can be any medium capable of bearing a visible or invisible image-precursor. The image-forming medium can include such media found in conventional discs. Exemplary image-forming media include paper, foil, film, plastic, rubber, sheet, cardboard, paper board, the material the comprises the disc, and other such materials know to those of ordinary skill in the art creating visible media. Alternatively, the image-forming medium can be a reflective, diffractive or refractive medium such as a holograph, lenticular lens and underlying lenticular image-bearing substrate, Fresnel lens and underlying lenticular image-bearing substrate, a half-tone screen and underlying segmented image, a fly's eye or multi-element lens and underlying segmented image, and other such media known to those of ordinary skill in the art.

Exemplary commercial sources for holographic image-forming medium include LIGHTRIX HOLOGRAPHIC PRODUCTS (San Leandro, Calif.), New Vision Technology (Vista, Calif.), Digillax (Southlake, Tex.), Technicolor (Ruckersville, Va.), or Holographic Design, Inc. (Ivy, Va.). Essentially any known holographic image-forming medium can be used. Holographic image precursor can be formed using conventional methods such as the Holocrunchies™ software program (http://www.iab.org/holocrunchies/html/) or Three Dimensional imagery software program (http://www.3dimagery.com/). Other methods known by those of ordinary skill in the art to generate holographic images can be used.

By discrete image is meant a readily viewable and discernible image that is observed by a person on a disc according to the invention when the disc is being played by a disc player in the presence of a pulsing or constant incident light through a pulsing or constant viewing port.

The image-precursor is one or more first visible or invisible images that may or may not form a discrete two- or three-dimensional image without the persistence of human vision and that form one or more of a discrete two- or three-dimensional image when the spinning image-precursor is viewed under incident light. The image-precursor comprises one or more image precursor segments that form a discrete image when viewed in a disc player as described herein. Exemplary image precursors include, without limitation, one or more of any one of the following: images used in a thaumotrope; a series or group of different two-dimensional images; a pattern; a series or group of images, such as those used in a phenakitiscope, kinephone, kineograph, kinetophonograph, mutophone, praxinoscope, zoopraxiscope, gramophone cinema, or zoetrope; a hologram; lenticular image; half-tone image; embossed image segmented image; and others known by those of ordinary skill in the art.

The plural image precursor segments may comprise: 1) plural smaller images that are the same; 2) plural smaller images that are different; 3) tracings; 4) pictures; 5) outlines; 6) photos; 7) geometric shapes; 8) irregular shapes; 9) regular shapes; 10) parts of a lenticular image; 11) parts of a holographic image; 12) parts of a two dimensional image; 13) plural different portions of the same image precursor; 14) other images known to those of ordinary skill in the art; or 15) a combination thereof.

Plural discrete images are viewable by changing various aspects of incident light striking the surface of the disc being played. For a strobe light, the rate and duration of the strobe can be changed. For a colored light, the color can be changed. Also a screen that cooperates with the plural image segments on the disc can be placed over or included in the viewing port. For example, the screen can comprise an image portion that together with the discrete image formed by the disc being played forms an assembled image. Alternatively, the incident angle of the light can be changed.

If a pulsing viewing port is used, the rate and duration of pulsing can also be controlled and changed to provide different visual effects. For example, the rate and duration of pulsing can be controlled in the substantially the same manner as for a pulsing light as described herein. Components and controls for pulsing the viewing port can be shared with or similar to such used for pulsing the light source.

The viewing port can comprise a simple or multiplex lens that modifies the image reflected from the surface of the disc being played to provide a desired visual effect. Any type of lens can be used.

Three dimensional images can be formed by employing a combination of red and green light sources with a color coded image precursor, by employing a red and green color coded image precursor and color coded eyeglasses, or by employing a hologram or diffraction grating.

An image-forming medium comprises an image precursor on or within a substrate. The image-precursor can be formed by printing, spray painting, laminating, holograph imagery, a lens and underlying segmented image combination, ray-tracing, computer graphics, photography, tracing, drawing, image transfer, screen-printing or likewise placing an image precursor on or within a substrate to be placed on the surface of the disc or on or within the upper portion of the disc itself. The substrate can be any material bearing images and includes, for example, paper, film, cardboard, paperboard, a laminate, foil, plastic, rubber, a sheet, metal, glass, leather, wood and combinations thereof. Alternatively, the image precursor may be formed by using plural embossed image precursor segments. The image precursor can be applied directly on the upper surface of the disc or it can also be included within the upper portion of the disc. An image precursor comprises one or more image precursor segments.

As depicted in the various figures, the light sources used to create the incident light can be located anywhere on the disc player. The figures depict light sources disposed within the receptacle, on or within the cover for the receptacle, adjacent the receptacle, separate but operably engaged with the disc player, adjacent the viewing port or in other locations as disclosed herein. If a constant (not pulsing) viewing port adaptation is used, it is only necessary that the light source cast incident pulsing light on the image precursor of the disc while the disc is being played such that a discrete image is formed when viewed. If a pulsing viewing port is used, the light source can be a pulsing light source or a constant light source.

Even though the light might be referred to as a constant light source, this does not mean that the light source must be constantly on during operation of the disc player. A constant light source is one that provides continuous illumination during operation of a pulsing viewing port. In other words, a constant light source may be on, off or pulsing before operation of a pulsing viewing port; however, it is for the most part continuously on during operation of the pulsing viewing port. Therefore, the constant light source and pulsing viewing port can provide substantially the same effect as a pulsing light source and a constant viewing port. A constant viewing port is one that for the most part does not pulse during operation of a pulsing light source. Given the above, the light source and viewing port can each operate in a pulsing or constant (non-pulsing) mode. It is necessary that at least one of the light source and viewing port pulse. It is also necessary that the light source and viewing port cooperate to form an intermittent image that can be perceived and viewed by a human to form a discrete image by the persistence of human vision.

A light source powered by an alternating current (AC) or direct current (DC) electrical source can be used. If a direct current electrical source is used, the disc player will require additional component(s), control(s), and/or circuitry to generate a pulsing light source. A light source powered by an alternating current already pulses, since the change in the direction of the electrical current occurs inherently. However, an AC source has a pulsing frequency that is too fast to power a light source to render it a pulsing light source according to the invention. Use of such a high frequency current, without modulation, will provide substantially the same result as a DC light source with no pulsing. Therefore, the frequency of AC direction change can be decreased by employing well know components to create a frequency-modulated AC light source, which then can be operated as described herein to create a pulsing light source according to the invention.

The light source can be one or more of an incandescent bulb, fluorescent bulb, laser, electroluminescent light, diode, cathode ray tube, spotlight, light beam, chemiluminescent light, light emitting diode or other light sources known to those of ordinary skill. The light source can comprise plural units such as two or more units.

FIG. 1 depicts a disc player system according to the invention. The system includes a disc (2), disc player (1), and a pulsing light source (not shown). The disc player comprises controls (24), a disc receptacle (22) that includes a rotating platen (turntable, 25), and a spindle (26) that is engaged with the disc (2). The lower portion (2*b*) of the disc includes a data storage medium, and the upper portion (2*a*) includes an image-forming medium. The lower portion (23) of the receptacle includes a disc reader that reads optical data from the lower portion (2*b*). In the embodiment of FIG. 1, the different discrete images are formed by viewing the disc at different horizontal angles (A1 through An). When a suitable light source casts an incident light upon the upper surface (2*a*) and the image is viewed by a person (5) from a first position (A1), a discrete two-dimensional image (3) and/or a three-dimensional image (4) is formed. In one embodiment, the disc can be viewed from another position (An) such that the same (3, 4) or different discrete images are formed.

FIG. 2 depicts a disc (2) that is adapted for use in a disc player modified according to the invention. While the disc is played, it is spun in a first direction (C) while its upper surface (6) is illuminated by a suitable light source (7) that projects incident pulsing light (B) onto the upper surface of the disc. When viewed by a person (5), a discrete three-dimensional image (4) is formed.

FIG. 3 depicts a disc player system (10) comprising the disc player (17), plural light units (11) of a light source disposed about the perimeter of the receptacle (14), a disc (13) disposed within the receptacle, a cover (16) having a viewing port (21) superposing the receptacle, a spindle (15) that engages the central aperture of the disc mounted on the rotating turntable (12), an activation switch (18), control buttons (20), and a display (19). As with most conventional disc players, the disc player rotates the spindle, and consequently the disc, at a predetermined rotational speed, e.g., revolutions per second (rps) or revolutions per minute (rpm). In this embodiment, the light units pulse (strobe) and cast an incident light on the surface of the disc at a first pulse frequency so that a first discrete image is formed when viewed from a first angular position (D1). When the pulse frequency is changed to a second frequency and/or the disc is viewed from a second angular position (D2), a second discrete image is viewed. Alternatively, the strobe light pulse frequency is adapted to match, or be a multiple or factor thereof, the rotational speed of the disc and a third image is viewable from a third angular position (D3).

When an image precursor made from a diffractive, reflective, holographic, refractive or lenticular material is used, two or more different images can be formed with the system of FIG. 3. For example, if the image precursor comprises a lenticular lens/image combination, as described above, with plural lenticular lens/image segments, a first discrete image will be formed when the played disc is viewed at a first position (D1) and a second discrete image will be formed when the played disc is viewed at a different second position (D2 or D3).

FIG. 4 depicts a disc player system (35) comprising a stationary or shelf-mounted disc player (27) and a disc (31) disposed in a disc-receptacle (33) of the player. The player includes an optionally recessing (flip-up) bank of lights (30) and an optional retractable light source (34) that casts a pulsing light upon the upper surface of the disc. The player includes a multi-disc cassette (29) disposed within a receptacle (28). The controls (32) are used to control the operation of the player and light source. Although not shown, the player can include a cover on the upper portion (36) of the player to cover the receptacle (33). The player includes a viewing port, which is either an open top of the receptacle, an opening in an optional cover (not shown), or a pane of transparent or translucent material covering the receptacle.

FIG. 5 depicts a portable player system (43) including a disc player (47), a disc (39) and one or more pulsing light sources (42, 37, 48). The actuation means (46) controls operation of the disc player and lights. The light (42) is operably engaged with the player by way of wires (44). The light (37) is retractable from the player and optionally foldable. The light (48) flips (swings or pivots) up from a horizontal off-position to an upright on-position. The light (48) can comprise one or more light units as the light source (30). The disc (39) is mounted on the platen (38) and engaged with the spindle (41). As the disc is played, a two-dimensional image (37) or a three-dimensional image (45) is formed when the disc is viewed by a person (5) under pulsing incident light. The light sources (42, 37, 48) cast incident pulsing light upon the upper portion or surface of the disc.

FIG. 6 depicts the system (60) comprising the player (62) and the disc (67) disposed in the receptacle of the player. The player includes a dome-shaped translucent, transparent or clear cover (65) hingedly engaged with the body of the player. The disc is engaged with the spindle (66) and mounted on the turntable of the player. The spindle includes a retractable member (64) that includes a light source (63) that casts incident light on the disc. The control means (61) controls operation of the disc and/or light source.

FIG. 7 depicts a sectional side elevation of a hand-held disc player (50). The player includes plural light emitting units (51) in the cover (52) covering the receptacle (53). The receptacle includes a sliding optical disc reader (49) adapted to read optical information from the lower portion of the disc in the receptacle. The disc player comprises various electronic components including actuation means (54), power source (56), motor drive (58), integrated circuit control chip (57), rheostat (55), capacitor (59) and power modulator (68) and others. The various electronic components are operably engaged by way of electricity or electrical signal conduits, such as wires, for example, or other electronic circuitry.

FIG. 8 depicts a system comprising the disc player (70) and the disc (71). The disc player includes a first electronic optical reader (80 in phantom), a second electronic optical reader (77 in phantom), a channel (in phantom) adapted to receive the first optical reader (80), a display (83), actuation means (82 and 84), a spindle (76), engagement means (72), a receptacle (73), a platen (74, in phantom), and plural light sources (or light units) disposed about the inner periphery of the receptacle. The disc includes optical data (75, in phantom) embedded within the disc. The engagement means (72) is attached to the spindle and is used to engage the edge defining the central aperture in the disc with the spindle such that the rotational speed of the disc matches the rotational speed of the spindle and/or platen or such that disc maintains a fixed angular position with respect to the angular position of the spindle. Actuation means (84) are used to activate, deactivate and/or control the light sources. Actuation means (82) are used to control operation of the playback (reading) and sound operations of the disc player. Some form of actuation means (82) are found in all commercially available disc players and can be used in the player of the invention.

The rotational speed of an optical disc player has been standardized by industry. Accordingly, a discrete image is formed when a disc player system according to the invention is played at the standardized speed(s). Generally, disc players operate at different rotational speeds when data is being read at different radial parts of a disc. For example, when a song from a first track of a CD is being played, the pulsing light source or pulsing viewing port will pulse at a first rate, and when a song from a second track of a CD is being played, the pulsing light source or pulsing viewing port will pulse at a different second rate. This is particularly true when optical data is loaded onto the optical disc information storage medium at a fixed rotational speed and fixed data writing speed.

The first electronic optical reader (80, in phantom) is adapted to slide within the channel (in phantom) and to read the optical data (75, in phantom) stored in the disc (71).

The data storage density in the disc (71) changes from a lower linear data density toward the outer radial periphery of the disc to a higher linear data density toward the central radial portions of the disc. In order to maintain a relatively constant data reading rate, (for example as measured in kilobytes of data read per second), the rotational speed of the spindle, and consequently of the disc, changes. For example, when the optical reader (80) is adjacent the central portion of the disc, the spindle will rotate at a speed of about 4–8 revolutions per second (rps), and when the optical reader (80) is adjacent the outer periphery of the disc, the spindle will rotate at a speed of about 8–12 rps. This is true because optical data is generally loaded onto the optical disc information storage medium at a fixed rotational speed and fixed data writing speed. Alternatively, data is loaded on the storage medium at continuously decreasing rotational speed and fixed data writing speed. In this case, a disc player maintains a relatively constant read rate by decreasing the rotational speed of the disc as it is being played.

The disc (71) should maintain a fixed angular position with respect to the spindle or platen such that the rotation speed of the spindle or platen equals or approximates the rotational speed of the disc. The disc player is able to discern the relative angular position of the disc with respect to the spindle, or with respect to a fixed position (79) on the player, by any of a number of means. A first angular position determining means includes indicia (78a and/or 78b) on, or within, the disc for use in combination with optical sensing means, such as the optical reader (80) or (77). One or both of the optical readers, which are located at fixed angular positions, can be adapted to sense indicia (78a, 78b) located on, or within, the disc. By so doing, an aspect of the strobing light source (81), or pulsing viewing port (not shown) can be coordinated, or synchronized in some way, with the rotation of the disc. For example, when the player senses that the indicia (78b) has passed over the optical reader (77), this information is passed on through the circuitry or chip(s) that controls the player to the strobing light source system and the light will strobe at a particular frequency. Likewise, when the indicia (78a) is sensed by an optical reader, the strobing light source will operate in a predetermined manner. For each case above, the same would be true if a pulsing viewing port is used, so that the pulsing viewing port pulses at a particular frequency or according to a predetermined manner.

The position-marking indicia (78a and 78b) are independently selected at each occurrence from the exemplary group consisting of data stored in the information storage medium of the disc, visible indicia, encoded indicia, invisible indicia, magnetic element, optical element, machine readable data and a combination thereof. One or more indicia can be used as position-marking indicia. The position-marking indicia can be embedded within the disc, disposed on the upper and/or lower surface of the disc, and/or disposed along the central and/or outer periphery of the disc. Alternatively, the control means for the pulsing light source, or pulsing viewing port, can read the electrical signal driving the motor that rotates the spindle. By so doing, the control means can synchronize the pulse frequency of the light source, or pulsing viewing port, with the rotational speed of the spindle. In another embodiment, an electronic and/or mechanical component determines the angular position of the spindle and this information is passed onto the controls for the pulsing light, or pulsing viewing port. The pulsing of the light, or pulsing viewing port, can be synchronized with the data stored in the disk. For example, optical data serving as position-marking indicia is included in various locations in the storage medium. The reading of this data is then synchronized with the pulsing of the light, or pulsing viewing port.

In yet another embodiment of the invention, the disc player or data in the disc includes an executable code that controls the pulsing of the light(s) and/or viewing port. For example, a light-controlling program (an exemplary synchronization means) is included in the disc or in the disc player. The program is read by computer components installed in the disc player. Depending upon the commands and logic flowchart of the light-controlling program, the light or viewing port will pulse in according to a predetermined manner.

The optical readers (77 and 80) are both shown below the plane of the disc; however, the optical reader (77), which does not read the optical data stored in the disc, can be disposed above the disc, such as in the cover of the player, or along side the periphery of the disc, so as to read indicia along the periphery of the disc, or in any location adjacent the disc. Suitable optical readers include those already found in known CD players, an electric-eye, or a combination thereof.

The optical reader (77) can operate either within or outside the visible wavelength range, where the visible wavelength is considered to be about 400 to about 700 nanometers. When above 700 nanometers, the information on the disc can be read by an electro-optical reading unit sensitive to light in the wavelength range above about 700 nanometers but below about 2,200 nanometers, or in the infrared (IR) range from about 800 nanometers to about 2,000 nanometers. The information on the disc, when not visible to the human eye, can be read by an electro-optical reading unit that operates in the ultraviolet (UV) or infrared wavelength ranges. The table below lists, by way of example and without limitation, some of the various combinations of light source, appropriate electro-optical reading unit (77, detector) and the optical response which is monitored as contemplated by the invention.

| Source | Detector | Optical Response |
|--------|----------|------------------|
| IR | IR | Differential reflectivity, transmissivity or long wavelength fluorescence |
| Visible | IR | fluorescence |
| Visible | visible | reflectivity or transmissivity |
| UV | visible | fluorescence |
| UV | UV | reflectivity or transmissivity |

The information read by the optical reader can be in the form of a bar code, hash marks, dot code, gray scale, line, series of lines, pixel and other similar formats. The information can be, although it need not be, discernible to the naked eye. Thus the information can be made a part of and can be masked by an image on the disc.

In yet another embodiment, the information can employ materials that produce a phosphorescent signal that can be read by the electro-optical reading unit. The information need not be disposed on the front surface of the disc. Thus, the information can be on either surface of the disc, embedded within the disc, covered by a laminate on a surface of the disc or masked by an image on the disc.

The player can include one or more light sources such as plural light sources (81). Each light source can independently comprise single or plural light emitting units. As depicted, the light sources (81) comprise plural multi-colored light emitting diodes (LED's), sometimes referred to as tri-color LEDs. These diodes are capable of emitting light in many different colors. A multi-colored LED can include three different color-emitting elements (red, yellow and blue) or two different color emitting elements (red and green). The emission frequency, period and pulse length of each element is controlled such that a single multi-colored LED can emit light pulses of different colors. These types of LED's are readily available commercially and are used in the manufacture of "moving-message electronic dot-matrix displays", such as those sold by I.I. Stanley (Irvine, Calif.), American Bright Optoelectronics Group (Brea, Calif.), TEK Solution, LLC (Alexandria, Va.), LEDtronics (Torrance, Calif.), Lite-On, Inc. (Milpitas, Calif.), QT Optoelectronics (Sunnyvale, Calif.), Panasonic, Matsushita Electronics (Secaucus, N.J.), Toshiba America Electronic Components, Inc. (Irvine, Calif.), Chicago Miniature Lighting, Inc. (Canton, Mass.), MCD Electronics, Inc. (Albuquerque, N.Mex.), Stanley Electric Co., Inc. (Tokyo, Japan), or Texas Digital Systems, Inc. (College Station, Tex.).

The light sources (81) can illuminate simultaneously, sequentially, alternately, randomly or according to a predetermined pattern. When illuminating simultaneously, all of the lights sources, pairs of the light sources, predetermined groups or individual ones of the light sources can illuminate the disc at the same time. When illuminating sequentially, two light sources adjacent one another, or spaced away from one another by one or more other light sources, can illuminate one after the other. When illuminating alternately, every other light source can illuminate. The pattern by which the light sources illuminate can be controlled by the user of the disc player and/or by the disc player itself.

In a first embodiment, FIG. 9 depicts a top plan view of a disc player (90) and the cover (92) for its receptacle. The cover includes a constant viewing port (91) through which the upper surface of the disc (93) is viewed. The constant viewing port (91) is depicted as included in commercially available disc players. This same viewing port can be used in a modified disc player according to the invention. In a second embodiment, the disc player (90) of FIG. 9 comprises a pulsing viewing port, or light valve. For example, the cover includes a pulsing viewing port (91) through which the upper surface of the disc (93) is intermittently viewed. In the second embodiment, the light source of the disc player is a constant light source or a pulsing light source.

The viewing port can be any size. As indicated by the arrows I—I, II—II, III—III and IV—IV, the angular width of the viewing port can comprise any portion of the cover (92). The radial height of the viewing port also can be varied as indicated by the arrow (A).

The viewing port can include a transparent or translucent pane, or it can be open. The viewing port can be integral with and/or defined by the cover. The viewing port can also be a translucent or transparent portion of the cover. Accordingly, a completely or partially translucent or transparent cover can serve as the viewing port.

A pane optionally covering the viewing port and/or a transparent or translucent portion of the cover can comprise indicia or one or more lenses that cooperate with the discrete image formed by the disc, in the absence of the indicia or lens, to form yet another discrete image.

A pulsing viewing port of the invention can be made using any conventional type of material having a transparency that can be rapidly pulsed in a controlled manner such that pulsing of the viewing port is done in coordination with rotation of a disc being played in the receptacle. A pulsing viewing port can be made by using a controller (electronic, digital, analog, computer, hardware, software or other type of controller described herein or known for the use of pulsing systems) to rapidly change the transparency, or light transmissivity, of the viewing port. For example, materials used to make light valves can be used to make the pulsing viewing port. U.S. Pat. Nos. 6,429,961, 5,822,107, 5,516,463, 5,463,492, 5,463,491, 5,409,734, 5,093,041, 5,002,701, 4,877,313, 4,407,565, and 4,247,175 describe the preparation and use of materials to make light valves, which are devices that control the transmission of light there through. For example, the material used to prepare a light valve can comprise an organic and/or inorganic light modifying material dispersed (sandwiched) between two translucent panels, which are made of any conventional translucent (transparent) material. When an electronic potential is placed on or across the light modifying material, the transparency of the light modifying material changes. In one embodiment, the light modifying material is transparent or translucent when the voltage is applied. In another embodiment, the light modifying material is opaque (not see-through) when the voltage is applied. Any known materials for use in make light valves can be used in the CD player of the present invention. A translucent or transparent material permits the transmission of light or an image there through.

A pulsing viewing port in combination with a constant light source can provide about the same visual affect as a pulsing light source and a constant viewing port, i.e. a viewing port that constantly permits transmission of light or an image. A viewing port can be both a constant viewing port and a pulsing viewing port depending upon its mode of operation. For example, in a first mode of operation, the viewing port can be a constant viewing port when it is cooperating with a pulsing light source, and in a second mode of operation, the viewing port is a pulsing viewing port when it is cooperating with a constant light source.

The pulse frequency, pulse length, pulse period, pulse interval or light transmissivity of a pulsing viewing port is controllable by a user or the CD player. If more than one pulsing viewing port is used, each can be independently controlled or they can be dependently controlled.

Suitable light modifying materials include a light blocking material, light-polarizing material, cross-linked polymer matrix having droplets of a liquid light valve suspension associated therewith, a film, a polymer matrix comprising an encapsulated material, an LCD, an SPD film, and any other such materials used in light valve devices. Electroluminescent or liquid crystal panels can also be used as well as any material which transparency can be controlled and modified by the application of an electrical potential thereto during operation.

According to the type of light source used, a particular material may be preferred for construction of the pulsing viewing port. For example, if the light source is a combination of two or more different types of light sources, i.e., emitting two or more different wavelengths of light, the pulsing viewing port may be adapted to selectively block one or more wavelengths of light while permitting the other one or more wavelengths of light to pass through. This would be done by using a viewing port construction comprising two different light modifying materials or elements that are separately controllable or operable.

The pulsing viewing port can also be made from the same type of materials used to construct electrically or electronically controlled privacy window panels. Such panels have a light transmission that is controllable. Depending upon the construction of the panel, light transmission will be either blocked or permitted when voltage is applied to light blocking material comprising the panel.

It is possible that the same control system used to control a pulsing light source can be used to control a pulsing viewing port. Alternatively, each can also have separate control systems. If both the viewing port and the light source pulse, their operation will be coordinated to provide an overall visual pulsing effect so that an image is created by the persistence of human vision.

FIG. 10 depicts yet another embodiment of a portable or hand-held disc player system (95) comprising a disc player (100), a disc (97), a cover (96), a pulsing light source (101) disposed with the cover, actuation/control means (104) disposed with the cover, operation display means (105) disposed with the cover, a viewing port (107) defined by the cover, a first digital data reader (108), an optional second digital data reader (102), opening and closing means (98) for the cover, a spindle (106), and a platen (99) disposed beneath the disc. The viewing port is a transparent or translucent pane or is an open area. The first digital reader (108) is disposed below the disc; whereas, the second digital reader is disposed below the disc or with the cover above the disc. The pulsing light source (101) is an electroluminescent lamp (EL) in this embodiment, but it can comprise any suitable light source described herein. EL's are available from a number of commercial sources such as Elumin8, Ltd. (Dorset, UK), Luminescent Systems, Inc. (East Aurora, N.Y.), Kriana Corporation (Alpine, Calif.), MetroMark, Inc. (Minnetonka, Minn.), or EL Specialists, Inc. (Piano, Tex.), which makes a very flexible EL that is printed onto substrates. When an EL is used, an EL driver will be required. EL drivers are available from IMP, Inc. (San Jose, Calif.), The Component Warehouse, Ltd. (Barlow, UK), Cyclops Electronics, Ltd. (York, UK), Sequoia Technology, Ltd. (Reading, UK), or SIPEX Corporation (Billerica, Mass.), which currently manufactures the smallest commercially available EL driver.

The operation of this system (95) is similar to the operation of the system (70) of FIG. 8; however, operation of the lamp (101) is necessarily modified. This lamp operates as a single unit that emits light in a pulsed manner. Plural EL's that operate as the other plural light source systems described herein can also be used. The optional position-marking indicia (103) is included in the upper or lower portion of the disc. In this embodiment, the position-marking indicia can be digital data, optical data, invisible (human eye imperceptible) indicia (indicia not readily viewable by the human eye), visible indicia or any other means used to mark the position of a moving object.

According to an alternate embodiment of the player (95), the light source (101) is either a pulsing light source or a constant light source and the viewing port (107) is a pulsing viewing port. In this exemplary embodiment, the viewing port comprises a major portion of the cover (96). The controllable light blocking element(s) that comprise the viewing port can be placed above or below the cover or can be embedded within the cover.

When the image precursors comprise hologram portions, lenticular image/lens segments, or other similar elements, a discrete image that changes when viewed at different incident angles can be formed. For example, FIG. 11a depicts a disc (110) comprising plural lenticular image/lens segments on the upper portion of the disc. Each lenticular image/lens segment comprises at least first and second interlaced striped images superposed by a lenticular lens. When a lenticular image/lens segment is viewed at a first incident angle, a first lenticular image is formed and when viewed at a different second incident angle, a second lenticular image is formed. In a first embodiment of disc (110), each of the first lenticular images is the same and each of the second lenticular images is the same. Accordingly, when the disc is viewed at the first incident angle while being played, the first lenticular image forms the discrete image. Likewise, when the disc is viewed at the second incident angle while being played, the second lenticular image forms the discrete image. In another embodiment of the disc (110), each of the first lenticular images is part of a first sequence of images, and each of the second lenticular images is part of a second sequence. In this embodiment, the first lenticular images will form a moving or changing first discrete image, and the second lenticular images will form a moving or changing second discrete image. Methods of forming moving or still lenticular images are well known and can be used to form the image precursor of the invention.

FIG. 11b depicts a disc (111) made according to the invention and including plural intersecting lenticular image/lens segments (112–115). This disc can be used to form even more discrete images when the disc is viewed from different angles. Likewise, the lens can be a fly's eye lens, a half-tone lens, compound lens or fresnel lens.

As in the description of FIG. 9, when the viewing port (and/or cover) comprises a pane, the pane can be a decoding lens. As used herein, a decoding lens is a lens that decodes an encoded image that is not readily discernible (although it may be readily visible) to the human eye and forms a readily discernible image. The above-mentioned lenses are also decoding lenses. For example, the disc (93) can be made to include an encoded image on its upper surface. When the encoded image is viewed through a decoding lens in the viewing port, a readily viewable (discernable) discrete image is formed.

Different discrete images can be formed by employing color-coded plural image precursor segments. For example, FIG. 12 depicts a disc (118) comprising plural image precursor segments (120) that absorb black light and reflect blue light and plural image precursor segments (119) that reflect black light and absorb blue light. When a pulsing light source that alternately emits blue and black light is shown onto the disc (118) at the appropriate frequency, a discrete image alternating between a blue and "black/white" square are formed.

FIG. 13 depicts a conventional optical data storage disc (116, a compact disc-CD) bearing the discrete image (117). When this disc is played in a conventional disc player not equipped according to the invention, a blurred image is formed when the disc is played. However, when the disc is played in a disc player according to the invention having a pulsing light, which pulse frequency is synchronized with the rotational speed of the disc, the same discrete image (117) is formed. Rather than using a simple discrete image (117) a geometric pattern that forms a still two-dimensional image when played and viewed in a disc player according to the invention can be used. One particularly important aspect of the invention is that a user will be able to read information on the upper portion of the disc while it is being played. Consequently, the user can read the name of the artist or group performing a song or the name of a song being played.

The discrete image can be a still image. FIG. 14 depicts the disc (121) having five similar image precursor segments (123) evenly spaced about the radial center of the disc. Each segment has a similar disposition relative to the radial center of the disc. When the disc is rotated at 5 rps and a strobe light having a pulse frequency of 5 or 25 pulses/sec is used to view the disc, a single image of an envelope and underlying paper is formed.

A discrete image can be a moving image. As with animated cartoons, the moving image can be made by viewing a plurality of related but differing sequential images (image precursors) wherein a subject is depicted in various different positions and/or locations. For example, a moving message effect is created by sequentially illuminating words, letters or portions or letters (pixels or bits of images) such that a test message is viewable through the viewing port. The viewing port can also include an magnifying lens.

A single disc can be used to form a moving and a still image discrete image. FIG. 15a depicts a disc (122) comprising plural image precursor segments (124) that are readily viewable when the disc is not being played. When the disc is played under normal non-pulsing incident light, a blurred strip (126) is formed and no discrete image is formed (See FIG. 15b). However, when a portion of the disc (122) that is slightly larger in size (in terms of angular width) than the size of an individual image precursor segment (124) is played and viewed under a controlled frequency strobe (pulsing) light set to a first strobe frequency while the disc is being played, a first discrete image is formed of a rotating disc on the disc (122) is formed. Specifically, when the strobe frequency is 2, 4 or 8 times the rotational speed (rps) of the disc, a moving image is formed, since two, four or all eight of the image precursor segments (124) are being repeatedly viewed. When the strobe frequency is 1 times the rotational speed (rpm) of the disc (122), a still image is formed since only one of the image precursor segments (124) is being repeatedly viewed. Rather than using different media that absorb different wavelengths of light, different discrete images can be formed by employing image precursor segments that possess different light reflective properties.

FIG. 16 depicts the disc (130) bearing four circular image precursor segments (131) and three triangular image precursor segments (132). The circular segments are spaced evenly about the radial center of the disc such that they are spaced by about 90°. The triangular segments are spaced evenly about the radial center of the disc such that they are spaced by about 120°. The position marker (A) indicates a specific angular position of a disc player. The first of the triangular images is located at position (A') of the disc, and the first of the circular images is located at position (B') of the disc. In this embodiment, we will assume that the disc player is rotating at 12 rps. When a ¼ or smaller angular portion of the surface of the disc (130) is viewed under a strobe light pulsing at 48 pulses/sec, a discrete image of a spinning disc is formed. On the other hand, when a ⅓ or smaller angular portion of the surface of the disc (130) is viewed under a strobe light pulsing at 36 pulses/sec and this pulsing arrangement is angularly offset with respect to the former pulsing arrangement, a discrete image of a spinning triangle is formed.

The beginning of a sequence of light pulses, i.e., the beginning of a sequence of pulse periods, can be offset so as to create more than one discrete image. FIG. 17 depicts the disc (128) bearing four dual-circle image precursor segments (129) and four circle-arrow image precursor segments (127). Each member of its respective group is angularly spaced away from an adjacent member of the same group by about 90°. Furthermore, the two groups are angularly offset from one another by about 45°. For this example, a rotational speed of about 8 rps for the disc can be used. Each group of image precursor segments can be viewed under a strobe light having a frequency of 8, 16, or 32 pulses/sec. When the initial pulse of the strobe light is set such that the position A of a disc player and A' of the disc (128) are adjacent one another, the discrete image of a angularly spinning arrow and circle is formed. When the initial pulse of the strobe light is coordinated such that the position A of the disc player and B' of the disc (128) are adjacent one another, the discrete image of a spinning dual circle is formed.

A discrete image can also be formed from a plurality of image precursor segments that are different, wherein each segment represents only a portion of a whole image precursor. FIG. 18 depicts the disc (135) bearing five image precursor segments (136–140) equally spaced about the radial center of the disc. In one embodiment, this disc is played at a speed of 5 rps in a disc player and viewed through a viewing port that reveals only a $⅕^{th}$ angular section of the surface of the disc. When a strobe light having a strobe frequency of 25 rps illuminates the $⅕^{th}$ angular section, a discrete image of an envelope and paper (123, as depicted in FIG. 14) is formed. Since the viewing port only reveals a $⅕^{th}$ section of the surface of the disc, the strobe light can also illuminate the entire surface of the disc. If however, a viewing port that exposes a greater than $⅕^{th}$ angular section is used, a strobe light that illuminates a less than or equal to $⅕^{th}$ angular section of the disc can be used. If the rotational speed of the disc were 7 rps, a strobe frequency of 35 pulses/sec would also form the intended discrete image.

As noted above, a disc bearing a lenticular lens/image precursor can be used. FIG. 19 depicts an alternate disc player system comprising a strobe light (151), a disc player having a cover (150) comprising a lenticular lens viewing port (149), a disc (148) comprising an encoded lenticular image (148), and a spindle (146) upon which the disc is mounted. When the disc is played and the spinning of the disc is synchronized with the strobe frequency of the strobe light, a discrete image is formed when the lenticules of the lens (149) align themselves with the linear portions of the encoded lenticular image. The strobe light can be disposed above, below, within or adjacent the cover.

In an alternate embodiment, the disc player comprises an electroluminescent lamp (145) disposed below the disc. In this embodiment, the disc is translucent or transparent such that light emitted by the lamp passes through the disc and serves to backlight the image precursor in/on the disc.

Each of the embodiments of FIGS. 11a through 19 can be operated in a similar fashion with a pulsing viewing port and a constant light source instead of a pulsing light source and constant viewing port. In this case, one or more the light blocking elements intermittently permit transmission of an image through the viewing port such that a subject viewing the transmitted image will perceive a discrete image by the persistence of vision.

Figure 20:
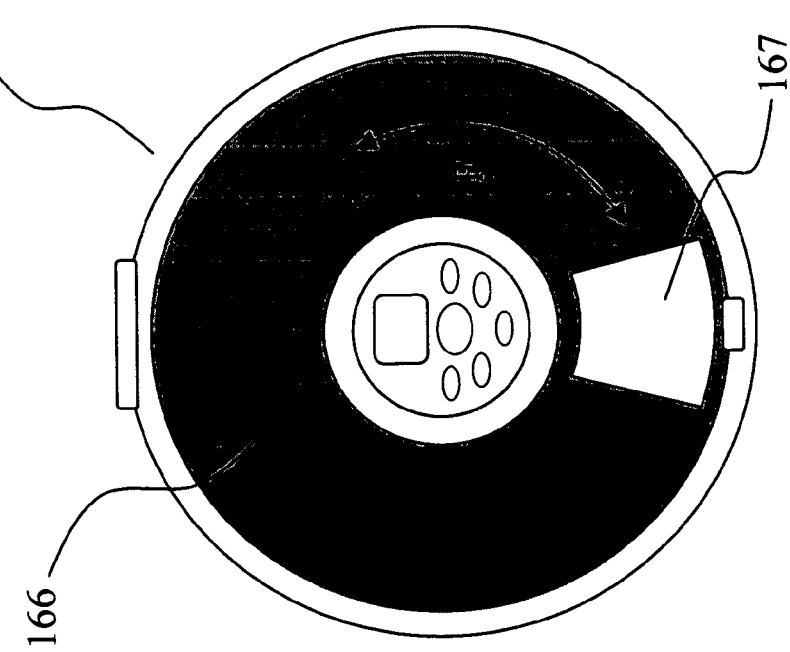
FIG. 20 depicts a top plan view of the cover of a disc player wherein the cover has a moveable viewing port disposed therein.

Another embodiment of the viewing port includes a viewing port of a fixed size that is movable about above a disc in a disc player. FIG. 20 depicts the cover (165) of a disc player. The cover comprises a slidable member (166) engaged with the cover and comprising a viewing port (167). The slidable member can rotate in the direction of the arrow (F) such that the location of the viewing port is angularly changeable, not fixed, with respect to the cover and a disc player to which the cover is engaged. This type of assembly is particularly useful for a disc player playing a disc with various different image precursors. By changing the disposition of the viewing port, the different discrete images that are formed can be viewed without having to use a position marking means on the disc or a position sensing means in the disc player. Alternatively, the disc player comprises a repositionable member that includes the viewing port, wherein the member is adapted to superpose the receptacle and an optional cover. This embodiment is particularly useful when the cover comprises one or more transparent or translucent portions. The viewing port (167) can be a constant viewing port or a pulsing viewing port.

According to another embodiment of the invention, a disc need not include any position marking media. In this embodiment, the disc player can synchronize the pulsing of the light, or viewing port, with rotation of the disc and/or spindle by determining the radial distance of the sliding optical reader, with respect to the radial center of the spindle, as it is reading data on a disc and by determining the relative angular position of the spindle with respect to a fixed position of the CD player. With this information, the disc player will know or be able to determine the rotational speed of the disc and to synchronize the pulsing of the light, or viewing port, with rotation of the disc and spindle even though the rotational speed of the disc and spindle changes during the period in which the CD is played. For example, a disc player includes software and/or hardware controls that determine or control the radial position of the optical reader as the disc player plays a disc. The disc player also includes software and/or hardware controls that determine or control the angular position of the spindle, relative to a fixed position on the CD player, as it rotates. In one embodiment, the disc player employs a constant read rate, and the CD has a decreasing linear data density, as measured from the radial center of the disc to its outer perimeter. The rotational speed (RS) of the disc will be calculated, determined or known according to the radial distance of the sliding optical reader with respect to the radial center of the spindle and the relative angular position of the spindle with respect to a fixed position of the CD player. Operation of the stepper motor used to slide the optical reader in its slot as it reads data can be synchronized or coordinated with operation of the motor used to rotate the spindle such that when the optical reader is spaced a fixed radial distance from the center of the spindle, the spindle will rotate at a predetermined rotational speed. Since the rotational speed will be calculated, known, or determined, the CD player need only know how many image precursor segments are on the disc and how many overall discrete images will be formed. The light(s), or viewing port, will pulse with each rotation of the disc or with each multiple or fraction of rotations of the disc. For example, if the disc is spinning at 5 rps and the disc comprises three image precursor segments that together form a discrete image, the discrete image will be formed when then the lights are pulsed at 15 pulses/sec.

In another embodiment, the disc player employs a changing read rate and the CD has a constant linear data density. Regardless of the characteristics of the linear data density of a CD being read, the disc player can be adapted to form a discrete image on a disc being played.

Figure 21:
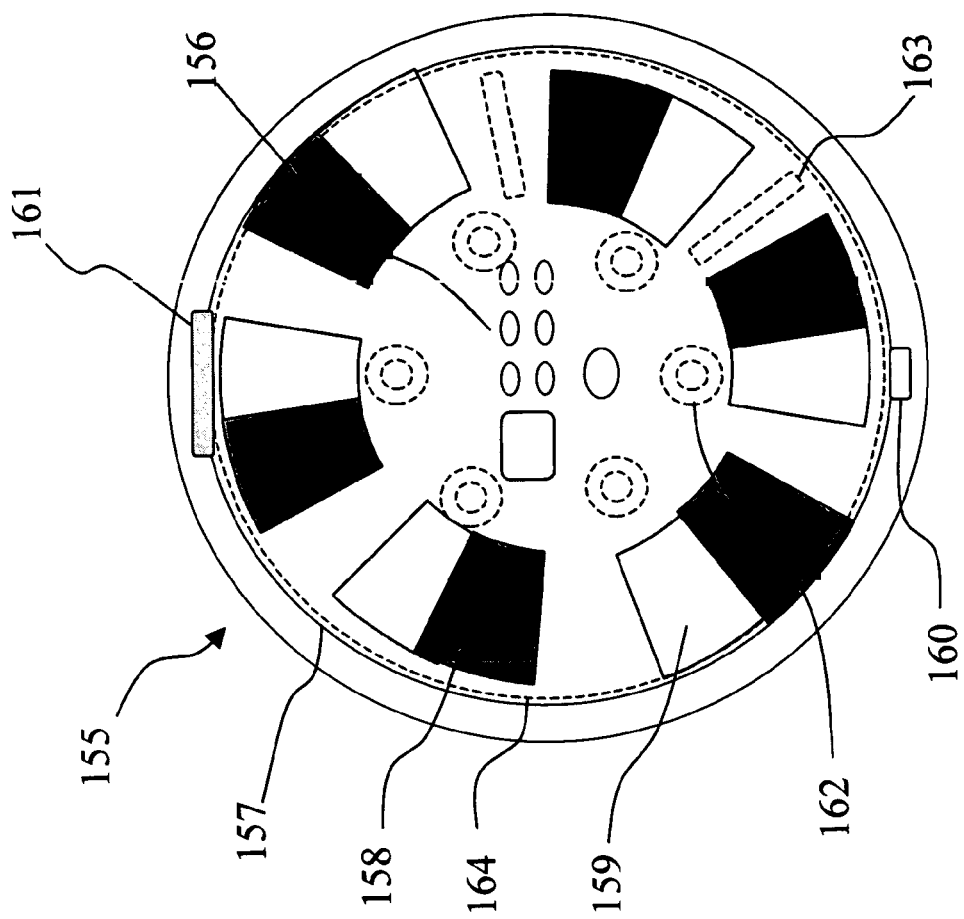
FIG. 21 depicts a top plan view of a disc player having a cover that includes six viewing ports each having a sliding cover therefor.

An alternate embodiment of the viewing port includes a viewing port which size can be changed by a user or by the disc player. In this embodiment, the viewing port has one or more opaque (or non-transmissive) slidable portions that can be moved about the viewing port to cover portions thereof to thereby form a viewing port with a variable size and optionally a changeable angular position. The disc player (155), depicted in FIG. 21, includes a cover (157) engaged to the body of the disc player by a hinge (161). The cover comprises plural viewing ports (159) disposed at different angular positions of the cover such that each viewing port reveals a different portion of the receptacle of the disc player. The viewing ports include viewing port covers (158) that are independently slidably engaged with the cover such that different portions of the receptacle of the player, and thereby of the upper surface of a disc within the receptacle, can be viewed independently of one another. In this exemplary embodiment, the cover also includes plural pulsing light sources (162) that operate dependently or independently of one another. Each light source is adjacent a respect viewing port. The cover also includes light insulators (163) disposed between the viewing ports. The light insulators serve to block the light emitted from a first light source from being viewable through a viewing port that is not adjacent that light source. The disc player can also include a light insulator (164) disposed along the periphery of the receptacle either above or below the disc such that light generated by the light sources (162) does not project below the surface of the disc and interfere with the performance of the optical data reader disposed below the disc. The controls (156) are used to control the conventional disc player functions and the operation of the pulsing light sources. The light sources can illuminate simultaneously, sequentially, alternately or randomly with respect to one another. The pulsing of the light sources is synchronized with the rotation of the spindle of the disc player and with the angular position of specific portions of a disc being played by the player. The cover of the disc player also includes a latch to maintain the cover closed as needed. Each viewing port cover (158) can comprise an optional locking means to temporarily lock the cover in place.

An alternate embodiment of the disc player (155) includes plural pulsing viewing ports. The pulsing viewing ports can be the same or different. A pulsing viewing port can comprise a light valve system or a light transmissive portion with a controllable viewing port cover (158). In this case, the player controls the rate at which, the period of time during which, and the interval between which a viewing port cover covers its respective viewing port. The viewing port cover is movably (slidably or rotatably) engaged with the cover for the receptacle.

As used herein, the terms strobe frequency (rate), interval, duration and period can be applied to the operation of a pulsing viewing port.

Exemplary embodiments of the invention include those wherein: 1) the strobe frequency, interval, period, duration (length), light spot or beam shape and/or color is synchronized with the rotational speed of the disc; 2) the strobe frequency, duration, interval, period, spot or beam shape, and/or color is synchronized with a particular rotational (angular) position of the disc; 3) the strobe, or constant, light source casts an incident light onto a predetermined location on the upper surface of the disc; and/or 4) the strobe, or constant, light source casts an incident light onto about the entire upper surface of the disc.

The pulsing of the light source(s), and/or viewing port(s), and thereby the formation of discrete images, can be coordinated (synchronized) with some aspect of the disc being played, such as for example, the information carried by the storage medium of the disc, the angular position of the disc relative to the spindle, the position of the image precursor(s) relative to the spindle, the position of the image precursor(s) relative to the stored information, other indicia borne by the disc and other such means. For example, the light(s), or viewing port(s) can be adapted to pulse in synchronization with the beat (rhythm) of music being played by the disc player.

A disc according to the invention will be engaged with the spindle of the disc player. FIG. 23 depicts a disc (170) and spindle (171) used in the system of the invention. The spindle comprises conventional engagement means (172) included in the spindle of almost all known conventional disc players. Rather than including optical reading means to detect the angular position of a disc being played in the disc player, the spindle can include engagement means (173) that engage with a specific mating engagement means (174) in or on the disc, especially adjacent the central aperture (181) in the disc. By so doing, the disc maintains a predetermined and fixed relative position with respect to the spindle. Therefore, by monitoring the angular position of the spindle, the respective angular position of the disc is known and the pulsing of the light source, or viewing port, can be synchronized with the angular position of the spindle. The angular position of the spindle can be controlled, determined or monitored electronically, optically and/or mechanically.

The disc can optionally include at least one female engagement means (178a, 178b) adapted to engage male engagement means (177a, 177b, respectively) located on the platen (179 in phantom). The lower surface of the disc can also optionally include a serrated or notched surface (180) adjacent the central aperture (181). This notched surface is adapted to mate with a respective surface on the platen and thereby maintain the disc at a fixed angular position relative to the spindle. If the system does not include mating engagement means (173 and 174, 177a and 178a, 177b and 178b, or 180), and only includes conventional engagement means (172), indicia (175, 176) can be included in/on the disc (170) and spindle (171), respectively. After the indicia (175, 176) are aligned, the disc player will know the relative angular position of the disc, since it will already know the relative angular position of the spindle.

According to another embodiment, the disc player is able to determine the relative angular position of the disc, and the image precursor(s), by knowing the specific angular position and specific radial sector location of the optical data stored in the information storage medium in the disc. For example, each sector of stored information has a fixed identification header, which is created when the disc is formatted, and a data area for variable information to be recorded onto (the writing operation) and subsequently played back from (the reading operation). The fixed header will contain the specific surface number, radial cylinder number and sector number for each sector. A stepper motor is used to position the read/write head of the disc player one increment (or cylinder) at a time. By reading the sector information of the sectors as they pass by the read head, the disc player will know the sector number (angular position) and the cylinder number (radial position) of the information. In this embodiment, the placement of the image precursor(s) in/on the disc is aligned (or coordinated) with the data stored in the disc; therefore, by knowing the relative radial position of the data, the disc player will know the relative position of the image precursor and will be able to synchronize the performance of the pulsing light, or pulsing viewing port, with the data stored in the disc.

A disc player of the invention optionally comprises means for determining the number, size and/or disposition of image precursor segments and/or groups of image precursor segments on the upper portion of a disc being played. Alternatively or in addition, the disc player comprises means for determining the number, size and/or disposition of position-marking indicia on the disc being played.

FIG. 24 depicts a disc (185) comprising plural image precursor segments a–x (186). When viewed in alphabetical order, a first image precursor segment (a) is angularly offset from a second precursor segment (b) by less than 90°. Likewise, the segment (c) is angularly offset from the segment (b) by less than 90°. By using this arrangement for the segments, a pulsing light (or combination of pulsing viewing port and constant light source) used to view them in alphabetical order will have a pulse frequency that equals the rotational speed of the disc times a non-integer value greater than four. On the other hand, if the segment (a) was displaced from the segment (b) by greater than 90°, then a suitable pulse frequency for the light source, or pulsing light source, would be equal to the rotational speed of the disc times a non-integer value less than four.

The disc player can read a disc containing an encoded image precursor formed by plural image precursor segments. For example, reading the text characters of FIG. 24 according to a predetermined sequence can form a message. The message will not be readily apparent by just viewing the characters when the disc is not being played; in other words, the message is encoded or embedded within the characters. However, when the disc is played and the lights, and/or viewing port, are pulsed according to a first predetermined sequence, the message is revealed. If the lights, or viewing port, are pulsed according to an incorrect second predetermined sequence, the message will not be revealed. The process of decoding the message can be achieved by programming command language for a predetermined pulse sequence into the memory of the disc player or into a data stream included in the storage medium of the disc such that when the disc is played, the lights, or viewing port, are pulsed according to that sequence.

In another embodiment, a first group of segments (a), (b), (c), and (d) are spaced equally apart, i.e., spaced by 90°, and a second group of segments (e), (f), (g) and (h) are spaced equally apart as well; however, the first group is angularly offset from the second group by 45°. In this case, a suitable pulse frequency for viewing the segments (a)–(h) in alphabetical order would be equal to the rotational speed times the integer 4. The number four is used since 90° is $1/4^{th}$ of a 360° revolution. However, after viewing the segments (a)–(d) with the first four pulses, the fifth pulse would begin after 135°, and not 90°, of revolution of the disc. In this case, the time period equivalent to the 135° rotation (the offset time) is equal to [1/ (the product of the rotational speed times four)] plus [1/(the product of the rotational speed times eight)]. The number eight is used since 45° is $1/8^{th}$ of a 360° revolution. For a rotational speed of four revolutions per second, the offset time is equal to 0.09375 seconds. The sixth pulse would then occur after 90°, and not 135°, of revolution of the disc, since the segments (e) and (f) are offset from one another by 90°. For a rotational speed of four revolutions per second, the time from the beginning of the fifth pulse to the beginning of the sixth pulse, i.e., the pulse period, is about 0.0625 sec.

The disc player of the invention can also be equipped with the appropriate components and software such that the pulse frequency, pulse period, pulse interval, pulse length (duration), pulse color, pulse intensity or a combination thereof is synchronized either directly or indirectly with one or more sounds, one or more images, or a combination thereof generated by audio or visual components of the disc player or of a device connected to the disc player. Generally, the audio component of a disc player is a headphone, a speaker or an attached audio electronic device. Generally the visual component of a disc player is a display such as those found in a television, projector, computer monitor, flat-panel display, flat screen or other similar electronic device.

Figure 25:
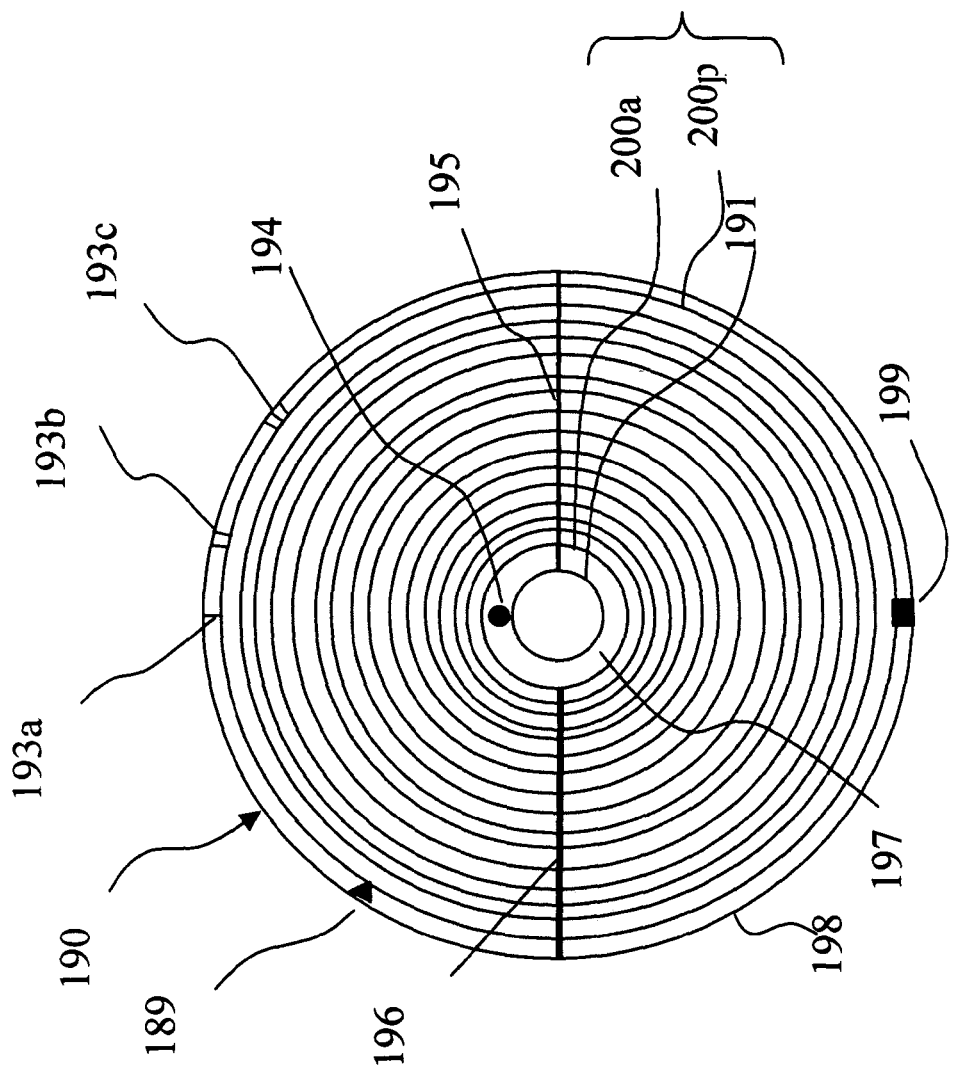
FIG. 25 depicts a bottom plan view of another disc according to the invention.

The pulsing, i.e., the beginning of the period of a pulse, of a light source or viewing port can be synchronized with the optical data stored in the information storage medium of the disc, with the rotation of the spindle and/or platen, or with the rotation of position-marking indicia in or on the disc, spindle or platen. Alternatively, the pulsing of the light source or viewing port can be synchronized with the reading of the optical data. FIG. 25 depicts a disc (190) comprising information (200) stored in the information storage medium in the lower portion of the disc, which opposes the upper portion of the disc bearing the image-forming medium. The information is stored in cylinders (200a–200p) that are concentric with the aperture (191) of the disc. Between the aperture and the information cylinder (200a) there is generally a blank area (197) that does not contain an optical information cylinder. The outer cylinder (200p) is proximal the outer periphery (198) of the disc. This disc comprises position-marking indicia (189, 194, 193a–193c, 196 and 199). An optical reader included in the disc player can be adapted to distinguish the various position-marking indicia. By so doing, the optical reader can send corresponding signals to the disc reader and thereby the controls of the light source to cause the light source to pulse in a specific manner (likewise for controlling the viewing port when a pulsing viewing port is used).

In one embodiment, the disc includes digitized audio data corresponding to specific songs. As the disc is played, an optical reader senses and identifies the indicium (193a) such that a first pulse pattern is created by the light source, or viewing port, when the first song (stored in cylinders 200a–200e, for example) is played. Likewise, upon completion of the first song, the optical reader senses and identifies the second indicium (193b) such that a second pulse pattern is created by the light source, or viewing port, when the second song (stored in cylinders 200*f*–200*j*, for example) is played. Upon completion of the second song, the optical reader senses and identifies the third indicium (193*c*) such that a third pulse pattern is created by the light source, or viewing port, when the third song (stored in cylinders 200*k*–200*p*, for example) is played. In this embodiment, the pulse frequency for each pulse pattern is different. This embodiment can be used to generate different discrete images.

In another embodiment, the optical reader senses the indicium (196), which is disposed between the optical data and the optical reader, is etched into the surface or body of the disc, or is comprised in the information storage medium. As the disc rotates, the indicium (196) is sensed by the optical reader, which is located at a changing but known location between the aperture and outer periphery of the disc. When the radial cylinder (200*a*) is being read, the optical reader will be proximal the aperture (191), and when the radial cylinder (200*p*) is being read, the optical reader will be proximal the outer periphery. By coordinating the radial position of the optical reader with the angular position of the indicium (196), the disc player is able to create different predetermined pulse patterns as the disc is being played. This embodiment can be used to generate different discrete images.

A simpler embodiment includes the indicium (199), which is sensed by an optical reader in the receptacle of the player. The light source can be made to pulse every time the indicium passes by the optical reader. In this way, the pulse frequency of the light source is synchronized with the rotation of the spindle, platen or disc regardless of the rotational speed of the disc. The indicia (189) and (194) can server the same function as the indicium (199). According to another embodiment, the disc includes position-marking sections (195) embedded within the information in the information storage medium. These position-marking sections can serve the same function as the indicium (196). Alternatively, the position-marking sections (195) include optical data the direct the disc player to create a particular pulse pattern.

Some optical discs have data stored therein in a continuous rather than stepwise fashion such that the data is laid out in a spiral rather than in a series of concentric cylinders as depicted in FIG. 25.

If the pulse pattern of the light source or viewing port is to be synchronized with the optical data stored in the information storage medium of the disc, the physical disposition of the image precursor in the image-precursor medium relative to the disc can be coordinated with the physical disposition of the optical data relative to the disc. For example, one or more indicia are included in the lower portion of the disc during manufacture and the image precursor is aligned with the indicia prior to placement of the image precursor on the upper portion of the disc.

As used herein, an anti-piracy system refers to an aggregation of one or more components that operate together to provide a system that is capable of allowing or disallowing the playing of digital/optical content stored on a CD or DVD placed into a player. The one or more components are selected from hardware, software or a combination thereof. The anti-piracy system employs a verification system that determines whether or not the player should be permitted to be play a CD or DVD placed into the player. The anti-piracy system determines the presence of a permission-granting indicator in and/or on the disc. If the permission-granting indicator is present, the verification system determines whether or not the permission-granting indicator meets predetermined criteria. If it does, then the verification system signals anti-piracy control means to permit playing of the disc. If it does not, the verification system signals anti-piracy control means to disallow playing of the disc. The characteristics of the permission-granting indicator can be unique to each disc or can be similar within a group of discs, e.g. multiple legal originals of a disc (each having essentially the same content) can contain the same indicator. Alternatively, substantially the same permission-granting indicator can be used across different groups of discs, e.g. groups of discs wherein each disc within a group contains substantially the same content but the content differs across the group.

As used herein, a permission-granting indicator (PGI) comprises any indicia/indicum which can suffice as means of indicating the identity of and/or content of a disc and/or of establishing a verifiable aspect of a disc. Alternatively or additionally, a permission-granting indicator provides verifiable information sufficient in content to permit the verification system to determine whether or not a player should be allowed to play the disc. The permission-granting indicator can be the same as or can comprise at least a part of the position marker. The permission-granting indicator can be different than and optionally spaced away from the position marker. It can be (optionally encrypted) code embedded in the storage media of the disc. The permission-granting indicator can be visually (by the human eye) perceptible or imperceptible, but it will be readable, detectable or sensible by reading means of a player, wherein the reading means can be the same as or different than reading means used to read the optical data stored in the storage medium of the disc. The permission-granting indicator can be any indicia/indicum such as software, optical/digital data stored in the disc, a graphic, text, differentially sensible material (a material which presence and required features can be sensed by its difference to surrounding material), barcode, hologram, diffraction grating, 2-D image, 3-D image, dot code, grey-scale code, change in refractive index, or a combination thereof. The indicator can be made detectable or sensible by any optical, visible, invisible (e.g., IR, UV, near IR, far UV), magnetic and/or electronic means typically used to identify objects. The PGI can also be software that controls operation of the disc player.

In one embodiment, the content of the disc is related to a specific permission-granting indicator. In this embodiment, the verification system determines at least one specific feature of the content and at least one specific feature of the permission-granting indicator. If the features together meet predetermined criteria, the verification system will send a signal allowing the disc to be played. In this manner, the information content (e.g., music, video, and/or data) of the disc is related to the permission-granting indicator. For example, a music CD comprising permission-granting indicator in or on the CD is placed into a player. The anti-piracy system determines the features of the music content and the indicator. At least one of the specific features that the indicator must possess (in order to permit playing of the music in the CD) is defined in data included in the storage medium of the disc. The verification system then compares the features of the actual indicator present to the at least one specific feature that is required by the embedded data. If the actual indicator meets the required criterion/criteria, then the verification system will permit playing of the CD. If not, then the player will not be allowed to play the CD. As another example, a specific required feature of the music content of the CD is embedded within the permission-granting indicator. In this case, the verification system determines whether or not the music content meets the required criterion. If so, the verification system will permit playing of the CD, and if not, it will not. The above-described examples can be combined such that dual or otherwise redundant or repeat verification is required.

Exemplary combinations of how verification data can be located and used in the system of the present invention are listed below:

device of the player, such that is cannot change after sale of the player to a user. In another embodiment, the access control data is stored semi-permanently in a memory storage device of the player, such that the device is sold with a first set of access control data, but that data can be changed after completion of manufacture of the player either by connecting the player to a computer system, replacing the memory storage device, or uploading data stored on a CD or DVD.

| Location and type of 1st verification data for PGI | Location and type of 2nd verification data for CD content | 1st possible result | 2nd possible result |
|---|---|---|---|
| Code embedded in storage medium of disc | Indicia (indicum) in or on CD | Both data present, and CD is played | One or both data are absent and CD is not played |
| Indicia (indicum) in or on CD | Code embedded in storage medium of disc | Both data present, and CD is played | One or both data are absent and CD is not played |
| Code embedded in storage medium of disc | Position marker | Both data present, and CD is played | One or both data are absent and CD is not played |
| Position marker | Indicia (indicum) in or on CD | Both data present, and CD is played | One or both data are absent and CD is not played |
| N/A | Indicia (indicum) in or on CD | Data present and CD is played | Data is absent and CD is not played |
| Indicia (indicum) in or on CD | N/A | Data present and CD is played | Data is absent and CD is not played |
| Code embedded in storage medium of disc | N/A | Data present and CD is played | Data is absent and CD is not played |
| N/A | Code embedded in storage medium of disc | Data present and CD is played | Data is absent and CD is not played |

The above-detailed combinations are merely exemplary of the many different embodiments covered by the present invention.

The verification system employs access control data as a means for establishing permission for playing of a disc. Access control data refers to data that the verification system uses as a basis for comparison of conditions establishing allowance or disallowance of play. The verification system compares the access control data to the verification data obtained from the PGI and/or disc content data to determine whether or not to permit play of a disc containing the PGI and/or disc content. For example, the access control data will contain a set of criteria that the verification data must meet in order to be permit play of a CD from which the verification data was obtained. In operation, after a disc is loaded into the player, the player obtains the verification data (e.g., the PGI) from the CD. The verification data is then compared to the access control data. If the verification data meets the criteria set by the access control data, then the disc can be played on the player.

Access control data is obtainable from a variety of sources. It is permanently or temporarily stored in a resident memory device of the player. In one embodiment, the access control data is stored permanently in a memory storage Access control data developed as part of an industry standard can also be used. In this case, the access control data includes a standardized set of criteria the must be met by the PGI and optionally content of a CD in order to permit play of the CD. The standardized data, for example, could include identifier codes specific to music publishers, artists, programmers, software companies, movie publishers, and other such industries. In one embodiment, the standardized data includes a table of identifier codes correlating song titles, album titles, performer name, movie titles, or story titles with their corresponding publishers. When a disc is placed in the player, the anti-piracy system might seek verification data containing a song title or performer name and corresponding publisher. If the verification data meet the required criteria, then the disc would be played.

Access control data and verification data can be encrypted or unencrypted. In either form, a player of the invention will be able to utilize the data to perform the functions claimed herein. The access control data and verification data must ultimately be accessible to the anti-piracy system in a form that the verification system can use the data. The table below indicates some exemplary locations for storing or obtaining the access control data and verification data.

| Component | Access control data | Verification data |
|---|---|---|
| Permanent or semi-permanent memory storage device in the CD | YES | Generally NO, but can be YES if the data is obtained from the CD to be played |

-continued

| Component | Access control data | Verification data |
|---|---|---|
| Temporary storage device (RAM, cache, buffer, etc.) | YES | YES if the data is obtained from the CD to be played |
| CD content | YES, but needs to be uploadable to the anti-piracy system | YES |
| PGI | YES, but needs to be uploadable to the anti-piracy system | YES |
| Position Marker | Generally NO. | YES |

There are specific embodiments of the invention in which the access control data and verification data are resident in specific components of the disc player system. Exemplary specific combinations of components and data are as follows: 1) access control data is stored in permanent or semi-permanent memory chip of a player and verification data is obtained from disc content and from a PGI in or on the disc; 2) access control data is initially store on the disc and subsequently transferred to a permanent, semi-permanent or temporary memory storage device in the player and verification data is obtained from disc content and/or from a POI in or on the disc.

As used herein, the image-producing system comprises the components contained within the disc player system for generating the image(s) formed by the persistence of human vision. In the disc player, the image-producing system comprises optionally-pulsing light source, optionally-pulsing viewing port, control means, and sensor(s) (detector(s) for the position-marking indicia on a disc), wherein at least one of the light source and viewing port pulses in coordination playing of a disc with the disc player. In a disc, the image-producing system comprises position-marking indicia and one or more image precursors (i.e. an image forming medium). In order to more fully integrate the image-producing system of the invention with the anti-piracy system of the invention, the verification data can be included in the position marker (position-marking indicia/indicum) employed by the image-producing system. More particularly, the position marker can comprise the PGI, or vice versa.

In an even more specific embodiment, the image-producing system and the anti-piracy system share one or more electronic components and/or software components. For example, the optical reader (77) used to obtain information regarding the position marking indicia can be used to obtain verification data and/or access control data. Likewise, the optical reader (80) used to read disc content can also be used to obtain verification data and/or access control data. In another embodiment, a single optical reader is used to obtain verification data and/or access control data, to read disc content and to obtain information regarding the position marking indicia.

The PGI can also comprise physical means of engagement. For example, the system of FIG. 23 includes various engaging means (177a, 177b, 178a, 178b, 173 and 174) adapted to mate. The disc player can be adapted to sense/detect acceptable engagement, such that verification of a condition of acceptable mating by the verification system will result in a signal of "play allowed".

According to another embodiment, the image generated by the image-producing system is evaluated by the anti-piracy system. In this case, the verification system compares the generated image to image data stored as access control data. If the generated image meets the required criteria, then the verification system will permit playing of the content by a user.

The following describes a specific exemplary embodiment of the disc player system of the invention comprising an image-producing system and an anti-piracy system. The player begins to spin the disc, and the optical reader that reads the position marking indicia of the image-producing system also reads the PGI of the anti-piracy system. The optical reader for reading disc content optionally also reads disc content without rendering the disc content viewable or audible by a user. If the PGI, and optionally disc content, meets established criteria, the player renders disc content viewable and/or audible by a user and coordinates pulsing of the light and/or viewing port with rotation of the spindle.

If the PGI is code embedded in the disc content, the code is read by the optical reader of the disc player and decrypted if necessary. After positive verification by the verification system, the disc player can render disc content viewable and/or audible by a user.

If the PGI is embedded within the position marking indicia, the optical reader adapted to read the position marking indicia generally also reads the PGI verification data, which is then processed as described herein.

The above is a detailed description of particular embodiments of the invention. It is recognized that departures from the disclosed embodiments may be made within the scope of the invention and that obvious modifications will occur to a person skilled in the art. Those of skill in the art should, in light of the present disclosure, appreciate that many changes can be made in the specific embodiments which are disclosed herein and still obtain a like or similar result without departing from the spirit and scope of the invention. All of the embodiments disclosed and claimed herein can be made and executed without undue experimentation in light of the present disclosure.

The invention claimed is:

1. A disc player comprising:
a disc receptacle;
one or more optionally-pulsing light sources that project incident light into the receptacle when the disc player is operated;
one or more optionally-pulsing viewing ports for the receptacle;
a rotatable spindle or platen in the receptacle; and
an anti-piracy system comprising a verification system adapted to compare verification data obtained from a disc to access control data;
wherein the frequency, pulse length, pulse interval, pulse period, color, intensity or a combination thereof of the viewing port and/or light source is either directly or indirectly synchronized with the rotation of the spindle or platen such that when a disc is being played by the disc player, one or more two-dimensional and/or a three-dimensional discrete images are formed on, below or above the viewable surface of the disc by the persistence of vision when the disc is viewed through the viewing port; and the anti-piracy system is adapted to allow or disallow playing of a disc in the receptacle of the player according to instructions received from the verification system.

2. The disc player of claim 1, wherein the anti-piracy system is adapted to obtain verification data from a disc in the receptacle of the disc player.

3. The disc player of claim 2, wherein the memory storage device of the disc player comprises access control data optionally obtained from a disc in the receptacle of the disc player.

4. The disc player of claim 3, wherein the memory storage device is a permanent or semi-permanent memory storage device.

5. The disc player of claim 3, wherein the memory storage device is a temporary storage device.

6. The disc player of claim 3, wherein the disc player comprises one or more optical readers adapted to read digital/optical content from a disc in the receptacle.

7. The disc player of claim 3, wherein at least one optical reader is adapted to read position marking indicia and/or permission-granting indicator from a disc in the receptacle.

8. The disc player of claim 3, wherein the disc player reads disc content and/or permission-granting indicator without rendering the disc content viewable or audible by a user.

9. A disc player comprising:
a disc receptacle;
one or more memory storage devices;
synchronization means;
a rotatable spindle and optional platen in the disc receptacle, wherein the spindle and/or platen comprises disc engagement means capable of maintaining a disc at a fixed angular position with respect to the spindle and/or platen;
at least one optical reader in the disc receptacle;
one or more operably engaged optionally-pulsing viewing ports for exposing at least a portion of the disc receptacle;
angular position determining means that determines the angular position of the spindle or platen relative to a fixed position on the disc player;
one or more optionally-pulsing light sources that project constant or pulsing incident light into the disc receptacle such that when a disc is being played by the disc player, one or more two-dimensional and/or one or more three-dimensional discrete images are formed on, below or above the viewable surface of the disc by the persistence of vision; and
an anti-piracy system comprising a verification system, the anti-piracy system being adapted to allow or disallow play of a disc by the disc player in response to verification data received from the disc and processed by the verification system.

10. The disc player of claim 9, wherein the anti-piracy system is adapted to obtain verification data from a disc in the receptacle of the disc player.

11. The disc player of claim 10, wherein the memory storage device of the disc player comprises access control data optionally obtained from a disc in the receptacle of the disc player.

12. The disc player of claim 11, wherein the memory storage device is a permanent or semi-permanent memory storage device.

13. The disc player of claim 11, wherein the memory storage device is a temporary storage device.

14. The disc player of claim 11, wherein the disc player comprises one or more optical readers adapted to read digital/optical content from a disc in the receptacle.

15. The disc player of claim 11, wherein at least one optical reader is adapted to read position marking indicia and/or permission-granting indicator from a disc in the receptacle.

16. The disc player of claim 11, wherein the disc player reads disc content and/or permission-granting indicator without rendering the disc content viewable or audible by a user.

17. A disc player system comprising:
a disc having a first side comprising an image-forming medium, disc player-readable digital or optical data, and verification data; and
a disc player comprising:
a disc receptacle;
at least one memory storage device;
a rotatable spindle and optional platen in the disc receptacle;
one or more operably engaged optionally pulsing viewing ports for exposing at least a portion of the disc receptacle;
one or more optionally-pulsing light sources that project incident light into the disc receptacle and onto the image-forming medium such that when the disc is being played by the disc player, one or more two-dimensional and/or one or more three-dimensional discrete images are formed on, below or above the viewable surface of the disc by the persistence of vision when the disc is viewed through the one or more viewing ports; and
an anti-piracy system adapted to allow or disallow playing of the disc by the player, the anti-piracy system comprising a verification system that compares verification data received from the disc to access control data that is resident in or on the disc and/or in the memory storage device.

18. The disc player system of claim 17, wherein the anti-piracy system is adapted to obtain verification data from a disc in the receptacle of the disc player.

19. The disc player system of claim 18, wherein the memory storage device of the disc player comprises access control data optionally obtained from a disc in the receptacle of the disc player.

20. The disc player system of claim 19, wherein the memory storage device is a permanent or semi-permanent memory storage device.

21. The disc player system of claim 19, wherein the memory storage device is a temporary storage device.

22. The disc player system of claim 19, wherein the disc player comprises one or more optical readers adapted to read digital/optical content from a disc in the receptacle.

23. The disc player system of claim 19, wherein at least one optical reader is adapted to read position marking indicia and/or permission-granting indicator from a disc in the receptacle.

24. The disc player system of claim 19, wherein the disc player reads disc content and/or permission-granting indicator without rendering the disc content viewable or audible by a user.

* * * * *